United States Patent
Shields et al.

(10) Patent No.: US 11,513,299 B2
(45) Date of Patent: Nov. 29, 2022

(54) PHOTON DETECTION DEVICE AND A METHOD OF MANUFACTURING A PHOTON DETECTION DEVICE

(71) Applicant: Kabushiki Kaisha Toshiba, Minato-ku (JP)

(72) Inventors: Andrew James Shields, Cambridge (GB); Zakaria Moktadir, Cambridge (GB)

(73) Assignee: Kabushiki Kaisha Toshiba, Minato-ku (JP)

(*) Notice: Subject to any disclaimer, the term of this patent is extended or adjusted under 35 U.S.C. 154(b) by 330 days.

(21) Appl. No.: 15/442,958

(22) Filed: Feb. 27, 2017

(65) Prior Publication Data

US 2017/0357061 A1 Dec. 14, 2017

(30) Foreign Application Priority Data

Jun. 13, 2016 (GB) .................................. 1610277

(51) Int. Cl.
| | |
|---|---|
| G02B 6/42 | (2006.01) |
| H04L 9/08 | (2006.01) |
| G01J 1/04 | (2006.01) |
| G01J 1/44 | (2006.01) |
| G02B 6/02 | (2006.01) |
| H04B 10/70 | (2013.01) |

(52) U.S. Cl.
CPC .......... G02B 6/4203 (2013.01); G01J 1/0425 (2013.01); G01J 1/44 (2013.01); G02B 6/02042 (2013.01); H04B 10/70 (2013.01); H04L 9/0852 (2013.01); *G01J 2001/442* (2013.01); *G01J 2001/4466* (2013.01); *G02B 6/4295* (2013.01)

(58) Field of Classification Search
CPC . G02B 6/4203; G02B 6/02042; G01J 1/0425; G01J 1/44
USPC ........................................................ 250/227.4
See application file for complete search history.

(56) References Cited

U.S. PATENT DOCUMENTS

| | | | | |
|---|---|---|---|---|
| 6,850,856 | B1* | 2/2005 | Gauthier | G06F 1/32 327/51 |
| 8,488,034 | B2* | 7/2013 | Nishihara | H04N 5/379 348/297 |
| 9,331,116 | B2* | 5/2016 | Webster | H01L 27/1464 |
| 10,153,310 | B2* | 12/2018 | Zhang | H01L 31/107 |

(Continued)

FOREIGN PATENT DOCUMENTS

| | | |
|---|---|---|
| GB | 2485400 A | 5/2012 |
| GB | 2510130 A | 7/2014 |

(Continued)

OTHER PUBLICATIONS

United Kingdom Search Report (with Written Opinion) dated Nov. 29, 2016 in United Kingdom Application 1610277.4 filed on Jun. 13, 2016.

(Continued)

*Primary Examiner* — Seung C Sohn
(74) *Attorney, Agent, or Firm* — Oblon, McClelland, Maier & Neustadt, L.L.P.

(57) ABSTRACT

A photon detection device, configured to couple to a multicore optical fibre, the device comprising a plurality of detection regions, each detection region being arranged to align with just a single core of the multicore optical fibre when the device is coupled to the multicore optical fibre.

19 Claims, 13 Drawing Sheets

(56) References Cited

U.S. PATENT DOCUMENTS

| | | | |
|---|---|---|---|
| 2008/0152147 A1* | 6/2008 | Xia | H04B 7/18595 |
| | | | 380/279 |
| 2009/0180734 A1* | 7/2009 | Fiorentino | G02B 6/43 |
| | | | 385/31 |
| 2011/0274435 A1 | 11/2011 | Fini et al. | |
| 2012/0014639 A1 | 1/2012 | Doany et al. | |
| 2012/0155806 A1* | 6/2012 | Doerr | G02B 6/29323 |
| | | | 385/37 |
| 2013/0082286 A1* | 4/2013 | Finkelstein | H01L 31/055 |
| | | | 257/84 |
| 2013/0087692 A1* | 4/2013 | Woodward | G01J 1/42 |
| | | | 250/227.11 |
| 2014/0153720 A1* | 6/2014 | Jezewski | H04L 9/0852 |
| | | | 380/256 |
| 2015/0054111 A1* | 2/2015 | Niclass | H01L 31/107 |
| | | | 257/438 |
| 2015/0115131 A1* | 4/2015 | Webster | H01L 27/14603 |
| | | | 250/208.1 |
| 2015/0215122 A1* | 7/2015 | Takahashi | H04L 9/0855 |
| | | | 380/283 |
| 2016/0163906 A1* | 6/2016 | Muscara' | H01L 27/1443 |
| | | | 257/432 |

FOREIGN PATENT DOCUMENTS

| | | |
|---|---|---|
| JP | 5-91125 A | 4/1993 |
| JP | 10-261999 A | 9/1998 |
| JP | 2009-20347 | 1/2009 |
| JP | 2013-511854 A | 4/2013 |
| JP | 2014-93731 | 5/2014 |

OTHER PUBLICATIONS

Brian F. Aull, et al., "Adaptive optics wavefront sensors based on photon-counting detector arrays", Proceedings of SPIE, Adaptive Optics Systems II, vol. 7736, 2010, 12 pgs.

Xudong Jiang et al., "InP-Based Single-Photon Detectors and Geiger-Mode APD Arrays for Quantum Communications Applications", IEEE Journal of Selected Topics in Quantum Electronics, vol. 21, (3), 2015, 12 pgs.

* cited by examiner i.

ii.

iii.

iv.

v.

PHOTON DETECTION DEVICE AND A METHOD OF MANUFACTURING A PHOTON DETECTION DEVICE

FIELD

The present disclosure relates to photon detection devices and methods of manufacturing photon detection devices.

BACKGROUND

Photon detectors are used in a number of applications including industrial inspection, environmental monitoring, testing of fibre optic cables and components, medical imaging, chemical analysis and scientific research.

Photon detectors are also important for many applications in quantum information technology, such as linear optics quantum computing, quantum relays and repeaters, quantum cryptography, photon number state generation and conditioning, and characterisation of photon emission statistics of light sources.

There is a continuing need to improve the photon detectors used in these applications.

BRIEF DESCRIPTION OF THE FIGURES

Devices and methods in accordance with non-limiting arrangements will now be described with reference to the accompanying figures in which.

DETAILED DESCRIPTION

Figure 1A:
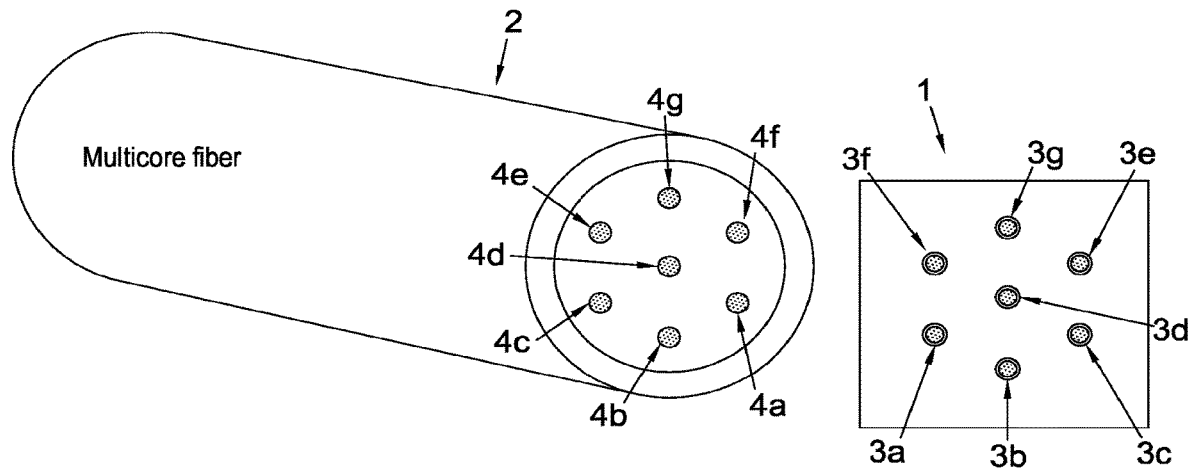
FIG. 1(a) is a schematic illustration of a photon detection device and a multicore optical fibre.

According to one arrangement, there is provided a photon detection device, configured to couple to a multicore optical fibre, the device comprising a plurality of detection regions, each detection region being arranged to align with just a single core of the multicore optical fibre when the device is coupled to the multicore optical fibre.

Thus the detection regions in the photon detection device are pre-aligned with the cores in the multi-core fibre.

The detection regions are arranged such that, in use, light emitted from a single core of the multicore fibre is detected at the detection region aligned with the core. Every detection region of the photon detection device is aligned with a single core of the multicore optical fibre when the device is coupled to the multicore optical fibre. Each core of the multicore optical fibre is aligned with just a single detection region when the device is coupled to the multicore optical fibre.

In an embodiment, the whole of the cross-sectional area of each core overlaps with at least a portion of the cross-sectional area of the corresponding detection region when the device is coupled to the multicore optical fibre. The area of each detection region may be greater than or the same as the cross-sectional area of the corresponding core. In an embodiment, each detection region has an area of less than 50 $\mu m^2$.

In an embodiment, the shortest distance between adjacent detection regions is 40 $\mu m$ or more.

The detection regions may be arranged in a radial formation. The detection regions may be arranged in a radial formation around a single detection region. The detection regions may have a rounded shape, for example a circular shape.

The detection regions may be identical in lateral size and shape.

In an embodiment, there are less than 20 detection regions.

The detection regions may be configured to detect a single photon.

The detection regions may comprise avalanche multiplication regions integrated on a semiconductor substrate.

Thus a compact device may be formed.

The photon detection device may comprise a p-i-n junction formed from a first semiconductor layer having a first conductivity type and a second semiconductor layer comprising two of more regions having a second conductivity type, wherein the first conductivity type is one selected from n-type or p-type and the second conductivity type is different to the first conductivity type and is selected from n-type or p-type.

The photon detection device may comprise a p-n junction formed from a first semiconductor layer having a first conductivity type and a second semiconductor layer having a second conductivity type, wherein the first conductivity type is one selected from n-type or p-type and the second conductivity type is different to the first conductivity type and is selected from n-type or p-type, wherein the first semiconductor layer is a doped layer which is doped with dopants of a first conductivity type and where there is a variation in the concentration of dopants of the first conductivity type such that the first layer comprises islands of high field zones surrounded by low field zones, the high and low field zones distributed laterally in the plane of the p-n junction, wherein the dopant concentration is higher in the high field zones than the low field zones.

Each detection region may be electrically coupled to a separate electrode. All of the detection regions may be electrically coupled to one or more common electrodes. Each detection region may be independently or simultaneously activated by an electrical signal.

According to another embodiment, there is provided an assembly, comprising the photon detection device, and the multicore optical fibre.

According to another embodiment, there is provided a quantum receiver, comprising the assembly.

The quantum receiver may comprise a plurality of decoding units and a multiplexing component, the multiplexing component configured to multiplex one or more outputs from the decoding units onto the multicore optical fibre.

The multiplexing component may be a fibre fan-out.

According to another embodiment, there is provided a quantum communication system, comprising a plurality of quantum transmitters and the quantum receiver.

Each quantum transmitter may be optically coupled to a separate core in the multicore optical fibre.

According to another embodiment, there is provided a method of designing a photon detection device configured to couple to a multicore optical fibre, the method comprising:
  obtaining the relative locations of a plurality of cores of the multicore fibre;
  determining the locations of a plurality of detection regions of the photon detection device such that each detection region is arranged to align with just a single core of the multicore optical fibre when the device is coupled to the multicore optical fibre.

The step of obtaining the relative locations may comprise measuring the relative locations.

According to another embodiment, there is provided a method of manufacturing a photon detection device configured to couple to a multicore optical fibre, the method comprising the method of designing a photon detection device and further comprising the step of manufacturing the photon detection device according to the design.

According to another embodiment, there is provided a method of manufacturing a photon detection device configured to couple to a multicore optical fibre, the method comprising:
  forming a first semiconductor layer which is doped with a dopant of a first conductivity type;
  forming a second semiconductor layer;
  forming a plurality of regions in the second semiconductor layer which are doped with a dopant of a second conductivity type, said regions being laterally separated and being aligned with just a single core of the multicore optical fibre when the device is coupled to the multicore optical fibre;
  wherein the first conductivity type is one selected from n-type or p-type and the second conductivity type is different to the first conductivity type and is selected from n-type or p-type.

In one embodiment, forming the regions comprises using gas emersion laser doping, implantation, diffusion, or etching and further fabrication.

In this specification, the term "multicore optical fibre" refers to an optical fibre comprising two or more cores.

In this specification, the term "multimode core" refers to an optical fibre core which supports transmission of two or more spatial modes.

FIG. 1(a) is a schematic illustration of a photon detection device 1 in accordance with an embodiment, and a multicore optical fibre 2.

The photon detection device 1 is configured to couple to the multicore optical fibre 2. The photon detection device 1 comprises a plurality of detection regions $3a$ to $3g$. The detection regions $3a$ to $3g$ are laterally separated. In this embodiment, the photon detection device 1 comprises 7 detection regions $3a$ to $3g$, however in general the photon detection device may comprise two or more detection regions. The multicore optical fibre comprises 7 cores $4a$ to $4g$. The detection regions $3a$ to $3g$ are arranged such that when the photon detection device 1 is coupled to the multicore optical fibre 2, each detection region $3a$ to $3g$ is aligned with just a single core of the multicore optical fibre 2. Thus when the photon detection device 1 is coupled to the multicore optical fibre 2 in a first orientation, first detection region $3a$ is aligned with first core $4a$, second detection region $3b$ is aligned with second core $4b$, third detection region $3c$ is aligned with third core $4c$, fourth detection region $3d$ is aligned with fourth core $4d$, fifth detection region $3e$ is aligned with fifth core $4e$, sixth detection region $3f$ is aligned with sixth core $4f$ and seventh detection region $3g$ is aligned with seventh core $4g$. In other words, each detection region is aligned with a core of the multicore optical fibre.

The lateral distribution of the detection regions $3a$ to $3g$ replicates the geometry of the cores $4a$ to $4g$ in the multicore fibre, allowing for geometrical tolerances. This ensures alignment between a detection region and the corresponding core when the photon detection device 1 is coupled to the multicore fibre 2. Thus the detection regions $3a$ to $3g$ in the photon detection device 1 are pre-aligned with the cores $4a$ to $4g$ in the multi-core fibre 2, reducing or avoiding further alignment procedures. In other words, the arrangement of the detection regions $3a$ to $3g$ relative to each other is pre-aligned with the arrangement of the cores $4a$ to $4g$, meaning that further adjustment of the relative arrangement of the detection regions $3a$ to $3g$ each time the photon detection device 1 is coupled to a multi-core fibre 2 is not required. In an embodiment, the cross-sectional area of each core in the multicore fibre overlaps with 80% of the cross-sectional area of the corresponding detection region. All of the cross-sectional area of each core in the multicore fibre overlaps with the corresponding detection region.

The photon detection device 1 is a compact device with a small area. The array of detection regions may be fabricated on a single semiconductor substrate, for example.

The photon detection device 1 and multicore optical fibre 2 assembly can be used in quantum key distribution (QKD) systems. Examples of such systems are described in relation to FIGS. 6 and 7. The photon detection device 1 allows easy assembly of the QKD system.

Furthermore, the bit rate of the QKD system is multiplied by the number of detection regions $3a$ to $3g$ in the photon detection device 1. A QKD system with a high bit rate can thus be built.

In an embodiment, the photon detection device 1 comprises a single detection region surrounded by further detection regions. The single detection region will be referred to as the central detection region. However, the central detection region need not be located at the geometric centre of the further detection regions, but may be located at any location in the area enclosed by the further detection regions. The further detection regions may form a ring around the central detection region. The further detection regions may be substantially equally spaced from the central detection region. The further detection regions may be substantially equally spaced from each other. The distance between the further detection regions may be substantially the same as the distance between the further detection regions and the central detection regions.

In an alternative embodiment, the photon detection device 1 does not comprise a single detection region surrounded by further detection regions, but comprises a plurality of detection regions in a ring-shaped formation, with no central region.

The cores in the multicore fibre may be uncoupled.

The photon detection device 1 may comprise yet further detection regions, for example, there may be one or more outer rings of detection regions surrounding the ring of further detection regions.

The photon detection device 1 shown in the figure comprises a single detection region surrounded by a ring of six further detection regions. The detection regions are circular in shape seen in the plan view, i.e. they have a circular cross-sectional shape. The detection regions form a hexagonal close packed structure.

Figure 4:
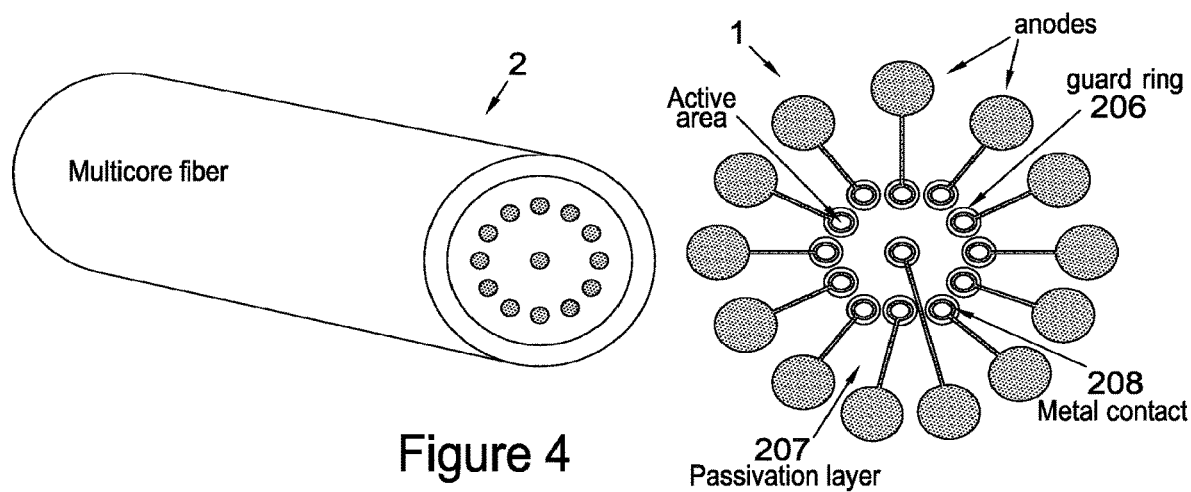
FIG. 4 is a schematic illustration of a photon detection device, and a multicore optical fibre.

In general, the detection regions may have any shape, for example rounded or polygonal, and may be arranged in any structure, depending on the configuration of the cores in the multi-core fibre 2. An alternative arrangement of the detection regions is shown in FIG. 4 for example.

In an embodiment, the cores 4a to 4g are arranged in a manner which has rotational symmetry, and the photon detection device 1 and the multicore optical fibre 2 can be coupled in multiple orientations. In each orientation, each detection region 3a to 3g is aligned with just a single core of the multicore optical fibre 2. However, some or all of the detection regions 3a to 3g align with a different core in the different orientations. In this case, the order of the symmetry of the multicore optical fibre 2 is six, therefore the photon detection device 1 can be coupled to the multicore optical fibre 2 in six different orientations. Any orientation of the photon detection device 1 with the multicore fibre is possible, as long as each core of the fibre is aligned with a single detection area.

Figure 1B:
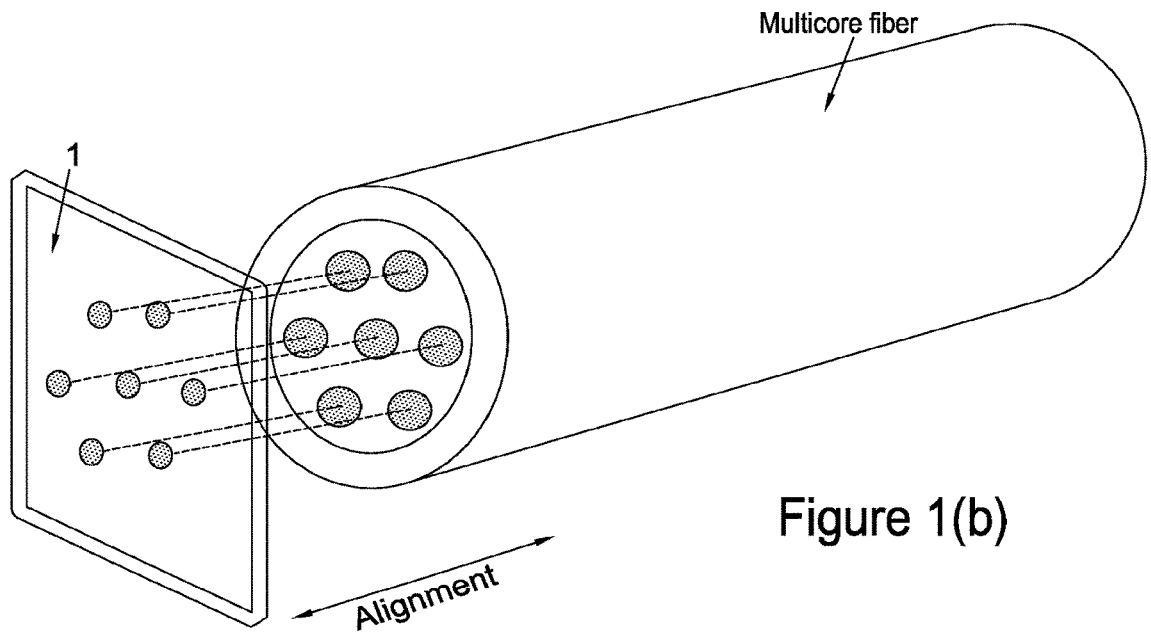
FIG. 1(b) is a schematic illustration of the photon detection device when aligned with the multicore optical fibre.

FIG. 1(b) is a schematic illustration of the photon detection device 1 in accordance with an embodiment, when aligned with the multicore optical fibre 2.

Although a hexagonal close packed structure with seven detection regions is shown, any arrangement and number of detections regions may be used, depending on the configuration of the cores in the multi-core fibre 2.

Light emitted from a single core of the multicore fibre 2 is detected at the detection region which is aligned with the core. Only light from the single aligned core is detected at each detection region. Light emitted from each core of the multicore fibre 2 is detected at a different detection region. Every detection region of the photon detection device is aligned with a single core of the multicore optical fibre.

In an embodiment, the cross-sectional area of each detection region is the same or greater than the cross-sectional area of the corresponding core.

In an embodiment, the cross-sectional area of the detection regions are larger than the cross-sectional area of the cores in the multi-core fibre. When the multicore fibre 2 is connected to the photon detection device 1, the entire cross-sectional area of each core overlaps part of the cross-sectional area of the corresponding detection region. The photon detection device 1 is aligned such that for each detection region, none of the cores aligns with an area outside of a detection region. All of the light emitted from each core thus impacts part of the corresponding detection region.

Furthermore, each core of the multicore optical fibre is aligned with just a single detection region. The light emitted from a single core interacts with, and is detected at, only a single detection area.

In an embodiment, the cross-sectional area of each detection region is larger than the cross-sectional area of the corresponding core. This results in good detection efficiency.

In an embodiment, each detection region has a cross-sectional area of less than 100 $\mu m^2$. In an embodiment, each detection region has a cross-sectional area of less than 40 $\mu m^2$. In an embodiment, each detection region has a cross-sectional area of less than 20 $\mu m^2$. In an embodiment, each detection region has a cross-sectional area of less than 10 $\mu m^2$. In an embodiment, each detection region has a cross-sectional area of less than 5 $\mu m^2$.

In an embodiment, the detection regions are between 5 to 50 $\mu m$ in width. In an embodiment, the detections regions are circular and have a diameter between 5 and 10 $\mu m$.

In an embodiment, the shortest distance between adjacent detection regions is 40 $\mu m$ or more. In an embodiment, the shortest distance between adjacent detection regions is 100 $\mu m$ or more. In an embodiment, the shortest distance between adjacent detection regions is less than 200 $\mu m$.

The detection regions may be sensitive to single photons.

Figure 1C:
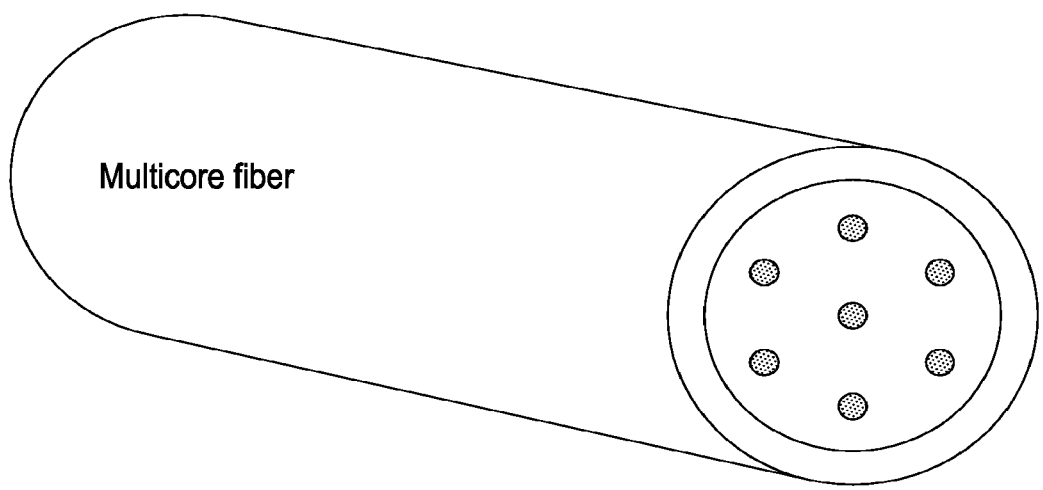
FIG. 1(c) shows a schematic illustration of a multicore fibre, which may be coupled with a photon detection device to form an assembly.

FIG. 1(c) shows a schematic illustration of a multicore fibre 2, which may be coupled with a photon detection device 1 to form an assembly in accordance with an embodiment. Each core is a transparent waveguide. The cores are surrounded by shared cladding. The cores run lengthwise along the multicore fibre 2. In the multicore fibre 2 shown, six cores are arranged in a ring, with the seventh core being inside the ring.

The difference between a multicore fibre 2 and an optical cable made of multiple fibres is the shared cladding. The cladding is the material that surrounds the core. The cladding has a lower refractive index than the core, in order to confine the optical mode(s). The multiple cores in a multicore fibre are all encased in a single shared cladding. In a multi-fibre optical cable however, each fibre is encased in a separate, individual cladding. Each fibre is thus a fully functional waveguide in itself and can be separated from the other fibres.

In one embodiment, the multicore fibre is configured such that transmission can occur over a distance of at least 50 km. In one embodiment, the multicore fibre is configured such that transmission can occur over a distance of at least 100 km. In one embodiment, the multicore fibre is configured such that transmission can occur over a distance of at least 200 km.

In one embodiment, the cores in the multi-core fibre are configured such that optical signals propagate at the same speed in each core.

The multicore optical fibre 2 permits transmission of one spatial mode per core.

Alternatively, one or more cores may permit transmission of two or more spatial modes, in other words, one or more cores may be multimode cores. Such a multicore fibre 2 is shown in FIG. 1(d).

Figure 1D:
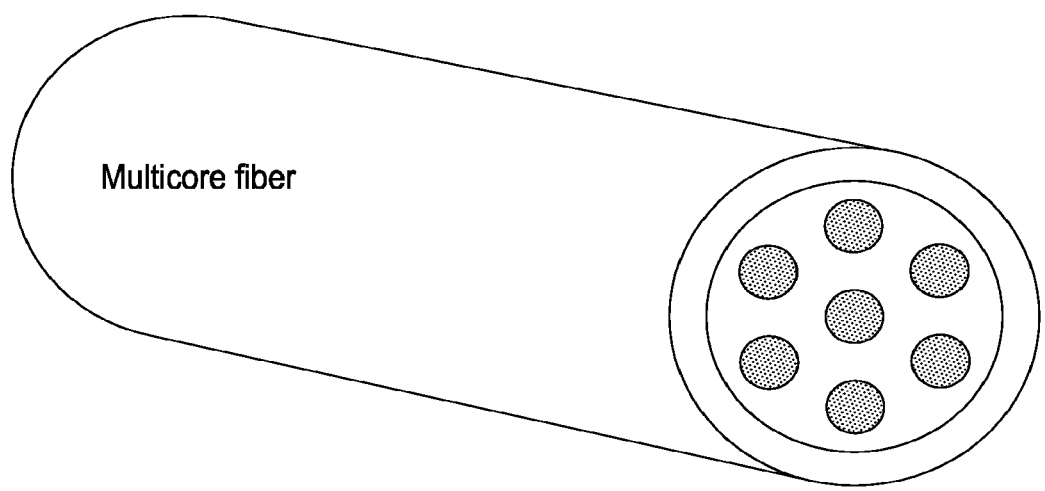
FIG. 1(d) shows a schematic illustration of an alternative multicore fibre, which may be coupled with a photon detection device to form an assembly.

FIG. 1(d) shows a schematic illustration of an alternative multicore fibre 2, which may be coupled with a photon detection device 1 to form an assembly in accordance with an embodiment. In this multicore fibre 2, all of the cores permit transmission of two or more spatial modes.

Multimode cores have a large diameter, thus support transmission of more than one spatial mode in the same waveguide. In an embodiment, the core diameter is 50 um.

In an embodiment, the photon detection device 1 is configured to couple to a multicore fibre in which the cores are multimode cores, the detections regions are circular and have a diameter between 50 and 100 μm.

Figure 2A:
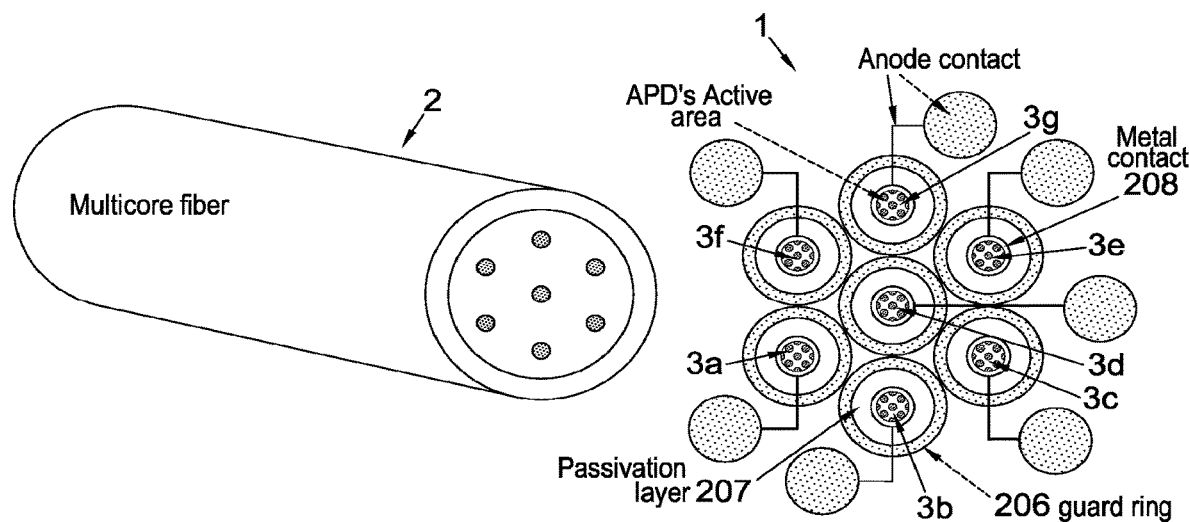
FIG. 2(a) is a schematic illustration of a plan view of an avalanche photodiode (APD) which is part of a photon detection device, together with a multicore optical fibre.

FIG. 2(a) is a schematic illustration of a plan view of an avalanche photodiode which is part of a photon detection device 1 in accordance with an embodiment, together with a multicore optical fibre 2. The detection regions 3a to 3g comprise an avalanche multiplication region integrated on a semiconductor substrate.

The device may be fabricated from one or more semiconductor materials, depending on the wavelength of the light which it is designed to detect.

Each detection region comprises an avalanche multiplication region. The detection region has a circular shape, seen in the plan view. Alternatively, the detection regions can be any shape, including polygonal and rounded, with the overall geometry being matched to the cross-sectional shape of the corresponding core of the multicore fibre.

A metal contact region 208 surrounds each detection region. Each metal contact region 208 may be a ring shaped region arranged around the outside of the detection region.

For each detection region, there is a corresponding contact. In this case the contact is an anode contact, however it will be appreciated that this could alternatively be a cathode contact. Each anode contact is connected to a metal contact region 208.

Each detection region may have a corresponding guard ring 206. The guard ring suppresses "cross-talk" between the detection regions. The guard ring 206 surrounds the detection region. Each guard ring 208 is a ring shaped region arranged around the outside of the detection region. The guard ring 306 is arranged outside of the metal contact region 208, with a distance between the guard ring 206 and the metal contact region 208.

Figure 2B:
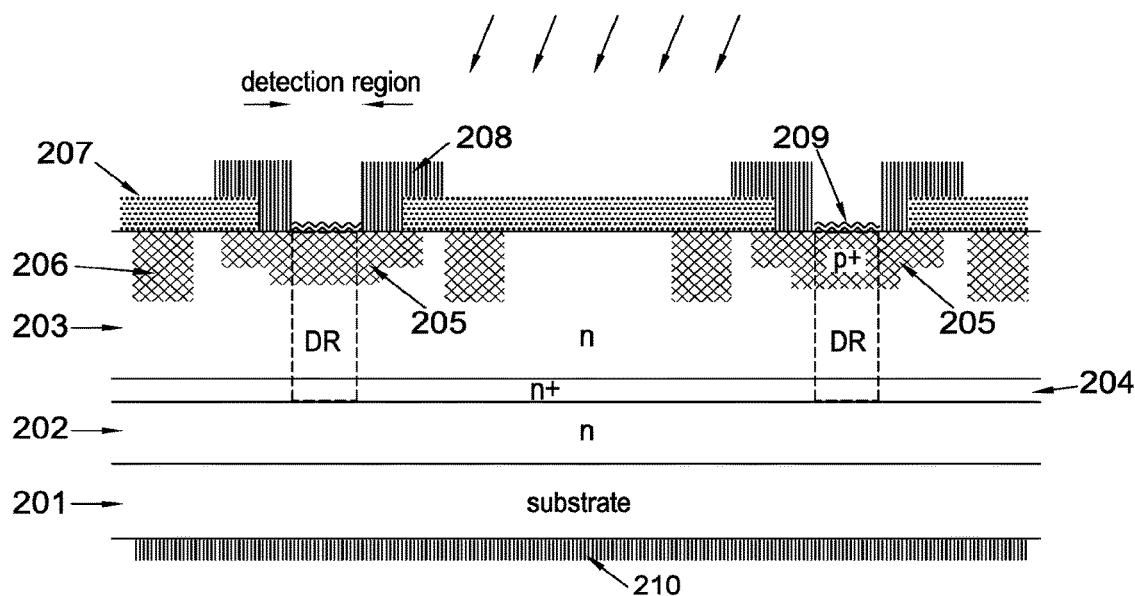
FIG. 2(b) is a schematic illustration of a cross-sectional view of the APD shown in FIG. 2(a)

FIG. 2(b) is a schematic cross-sectional view of the APD shown in FIG. 2(a).

The APD comprises a first layer 203 of a first conductivity type and a second layer 202 of the first conductivity type. These are lightly doped or even un-doped layers. The APD further comprises a highly doped layer 204 of the first conductivity type. The highly doped layer 204 is overlying and in contact with the second layer 202. The first layer 203 is overlying and in contact with the highly doped layer 204.

The first conductivity type is n-type and the second conductivity type is p-type. However, it will be appreciated that using alternative structures the first conductivity type can be p-type and the second conductivity type n-type.

The second layer 202 is overlying and in contact with a substrate 201. Alternatively, an intermediate layer or layers, such as a buffer layer, may be provided.

The first layer 203 comprises two or more highly doped regions 205 of the second conductivity type, which have a higher dopant concentration than the remainder of the first layer 203. These regions are "islands", i.e. each is laterally separated from the other high dopant concentration regions 205.

For the avoidance of doubt, the term "high dopant concentration region" refers to the concentration of the carriers donated by the dopant.

The highly doped regions 205 are located at the surface of the first layer 203. The depth of the highly doped regions is less than the depth of the first semiconductor layer 203.

The highly doped regions 205 have a circular shape seen in the plan view, in other words they have a cylindrical shape. The highly doped regions can in principle be any shape however, including polygonal and rounded, with the overall geometry being matched to the cross-sectional shape of the corresponding core of the multicore fibre. In this case, the highly doped regions have a portion having a smaller diameter and a portion having a larger diameter at the surface of the structure. This reduces edge breakdown.

The detection regions DR are shown in the figure. The detection regions comprise the regions between the metal contacts 208 and covered with the anti-reflective coating 209, from the highly doped region 205 down to the highly doped layer 204.

The structure may also comprise guard rings 206. The guard rings 206 are arranged around the outside of the highly doped regions 205. In this case, the guard rings 206 are circular, however, they can in principle be any shape, including polygonal and rounded, with the overall geometry being matched to the shape of the highly doped regions 205. The guard rings 206 are also highly doped regions of the first layer 203 and are highly doped regions of the second conductivity type. The guard rings 206 have the same conductivity type as the highly doped regions 205. The guard rings 206 are located at the surface of the first layer 203. The depth of the guard rings 206 is less than the depth of the first semiconductor layer 203.

A passivation layer 207 is overlying and in contact with the surface of the structure, except for a portion of the surface above each highly doped region 205. The passivation layer 207 is overlying and in contact with an outer portion of the surface of the highly doped regions 205, and is not overlying and in contact with an inner portion of the highly doped regions 205.

The metal contact region 208 corresponding to each detection region is overlying and in contact with the edge portion of the passivation layer and an outer portion of the inner portion of the highly doped region 205.

The remaining portion of the highly doped region 205, that is, the portion of the highly doped region which is not covered by the passivation layer 207 or the metal contact region 208 is the active area of the detection device 1, and forms part of the detection region.

An anti-reflective coating 209 may be overlying and in contact with the remaining portion of the highly doped regions 205.

A separate anode contact is connected to each metal contact region 208, such that each metal contact region, and thus each detection region, is connected to a separate anode. A single second metal contact region 210 is formed on the opposite side of the substrate 201 and is connected to a cathode.

In use, a p-i-n junction is formed from the highly doped p-type region 205, the n-type layer 203 and the highly doped n-type layer 204, forming an avalanche region.

A voltage is applied between each anode and the cathode. A high electric field is generated across the interface between the highly doped n-type layer 204 and each highly doped p-type layer 205. Avalanche multiplication can occur in this region when a suitable bias is applied across the junction.

The depth of the highly-doped layer 204 can be less than 0.1 μm such that a thin junction with a shallow depletion region is achieved, with the APD having a corresponding low breakdown voltage. The breakdown voltage will also depend on the doping level of the layer 204 and the doping level and depth of the region 205.

The regions of the device within the metal contact regions 208, that is the exposed portions of the highly doped regions 205, or the portions of the highly doped regions 205 covered in an anti-reflective coating 209 form the detection regions of the device.

The size, geometry and arrangement of these regions can be controlled by manipulating the 2-D doping profile of the highly doped p-type regions 205 in the plane of the p-i-n junction according to the size, geometry and arrangement of the cores in the multicore fibre 2.

The shape and size of the detection regions can be controlled by varying the shape and size of the passivation layer 207 or the metal contact regions 208, as well as that of the highly doped regions 205 for example.

In an embodiment, the highly doped p-type regions 205 will have a doping concentration of at least $10^{16}$ cm$^{-3}$, in a further embodiment at least $10^{17}$ cm$^{-3}$ or $10^{18}$ cm$^{-3}$. In an embodiment, the doping concentration of the rest of the first layer 203 is at least a factor of 10 lower than that for the high field zones 205, in a further embodiment a factor of 100 lower. The doping level of the region 203 may be less than $10^{16}$ cm$^{-3}$ for example.

Figure 2C:
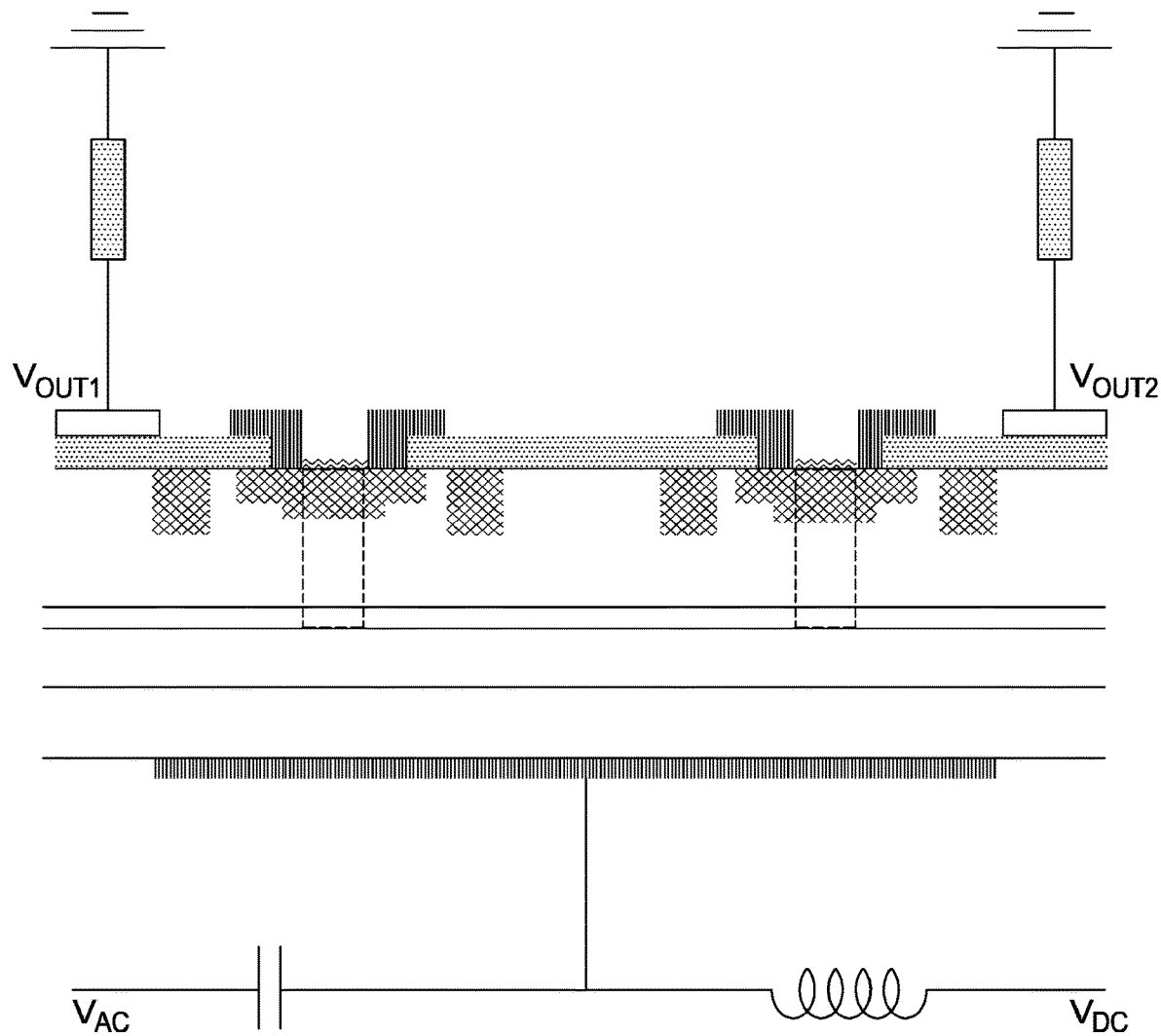
FIG. 2(c) shows a schematic illustration of the APD showing the circuit connections.

FIG. 2(c) shows a schematic illustration of the APD showing the circuit connections to the APD in accordance with an embodiment.

The APD may be operated in Geiger mode. In Geiger mode operation, a reverse voltage that exceeds the breakdown voltage is applied to the APD. Light incident on the surface of the device on which the anti-reflective coating 209 is coated, i.e. at the side of the substrate on which the layers are fabricated, is absorbed and generates carriers. The light is absorbed in the region 202, generating carriers which drift to region 203 to multiply in the high electric field regions due to impact ionisation. The high electric field across the interface between the highly doped n-type layer 204 and the highly doped p-type regions 205 means that avalanche multiplication occurs in these regions when a voltage above the breakdown voltage is applied across the junction. The generated carriers are thus multiplied in the avalanche multiplication region. The resultant output signal for each detection region, $V_{OUT}$, is measured at the corresponding anode contact 208. The detection regions DR comprise the regions between the metal contacts 208 and covered with the anti-reflective coating 209, from the highly doped region 205 down to the highly doped layer 204.

For a gated photon detector, a time varying voltage may be applied through a bias tee circuit. An AC voltage component $V_{AC}$ and a DC voltage component $V_{DC}$ are combined using the bias-tee circuit. The bias tee circuit comprises, on a first arm of the tee, a capacitor connected to the AC voltage source and, on the second arm of the tee, an inductor connected to the DC voltage source. The bias tee circuit is connected to the cathode contact of the APD, i.e. metal contact 210. The bias voltage applied to the APD thus comprises both a DC component and an AC component. The bias voltage applied to the APD is above the breakdown voltage at its highest values and below the breakdown voltage at its lowest values. When the bias voltage exceeds the breakdown voltage the detector is gated "on", when it is below the breakdown voltage the detector is gated "off". The frequency of the AC voltage component is thus the gating frequency. The gating frequency may be synchronised with the driving frequency of the photon source in a QKD system for example. There may be a separate AC source for each detection region, in which case each region may be gated separately. Alternatively, the detection regions may be biased in common mode.

In alternative embodiments, the photon detection device is not gated, and is operated in continuous mode. A DC voltage which exceeds the breakdown voltage is applied.

Depending on the operation temperature and the device structure, the breakdown voltage for APDs can vary from 20 to 300 V.

In an embodiment, the output of the APD for each detection region is measured at a resistor which is connected to ground. Each anode contact 108 is connected to a resistor. When a photon is incident on the detection region, an avalanche photocurrent is induced, which leads to a voltage across the resistor corresponding to the output voltage, $V_{out}$. Other circuitry may be used to measure the electrical output of the detection regions.

The avalanche photocurrent signals from each detection regions are measured at a separate anode. Thus it can be determined which detection region corresponds to each detection, and thus which core of the multicore fibre corresponds to the detection. Each detection region is single-photon-sensitive when elevated into an above-breakdown state by the periodic bias voltage signal. Each of the detection regions is therefore able to independently support the discrete avalanche multiplication of a locally excited photocarrier. The detection regions are coupled electrically to a separate anode, thus contributions to the avalanche photocurrent from photons absorbed in each of the detection regions can be distinguished.

In an embodiment, the output is connected to a self-differencing circuit. In a self-differencing mode of operation, the background of the output signal is removed by comparing a part of the signal with an earlier part of the signal.

In a further embodiment, the circuit comprises a discriminator configured to compare the measurement of the avalanche event with multiple predetermined levels.

Figure 2D:
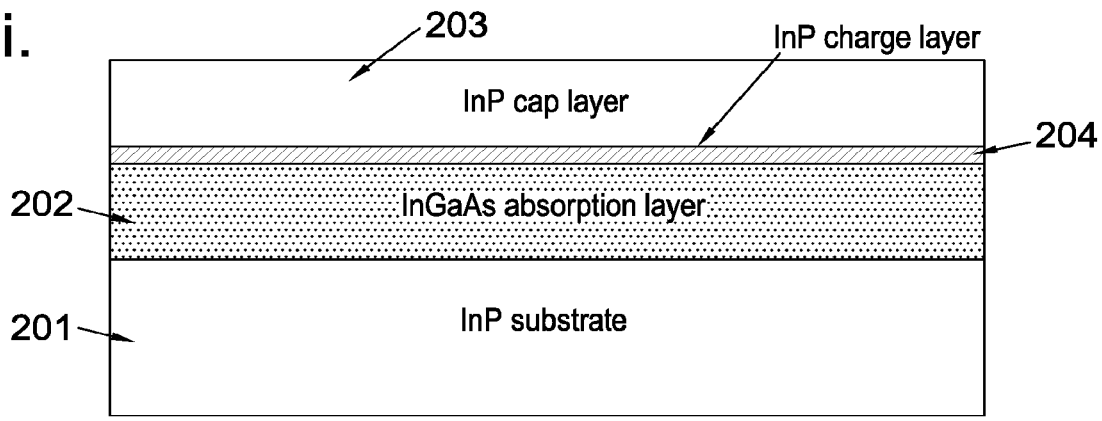
FIG. 2(d) shows the fabrication sequence for a device such as is shown in FIGS. 2(a), 2(b) and 2(c)
Figure 2D:
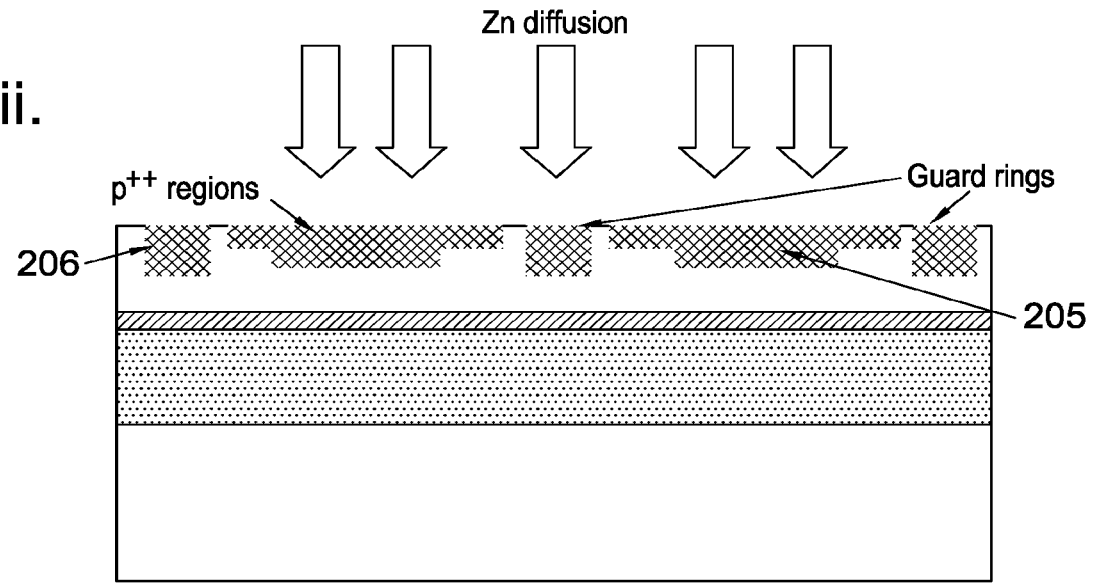
Figure 2D:
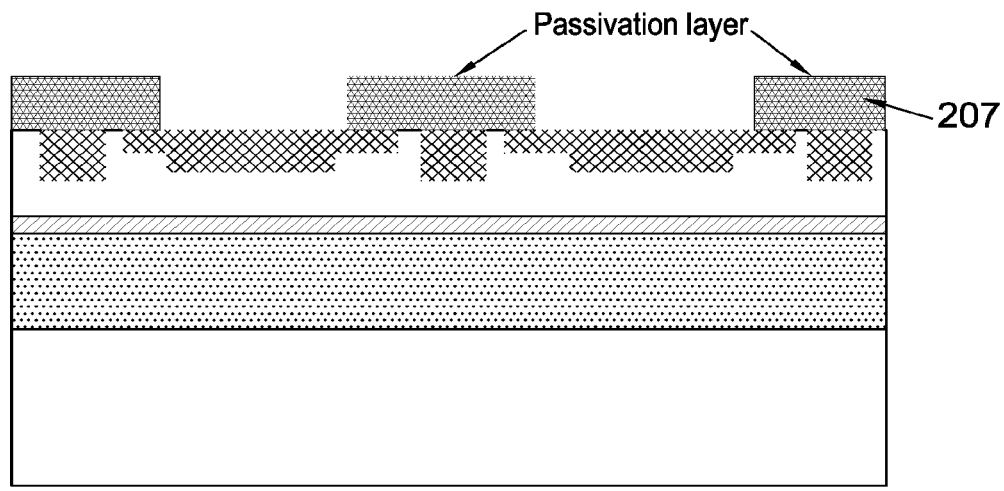
Figure 2D:
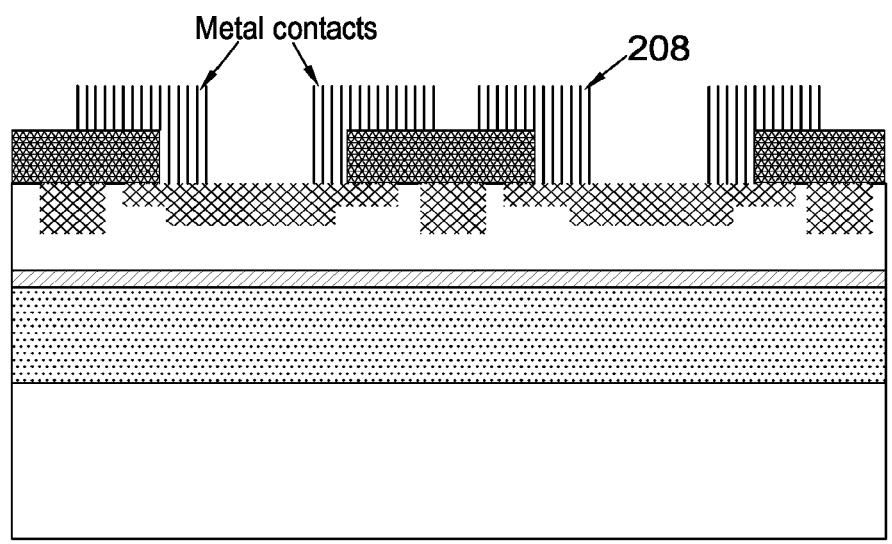
Figure 2D:
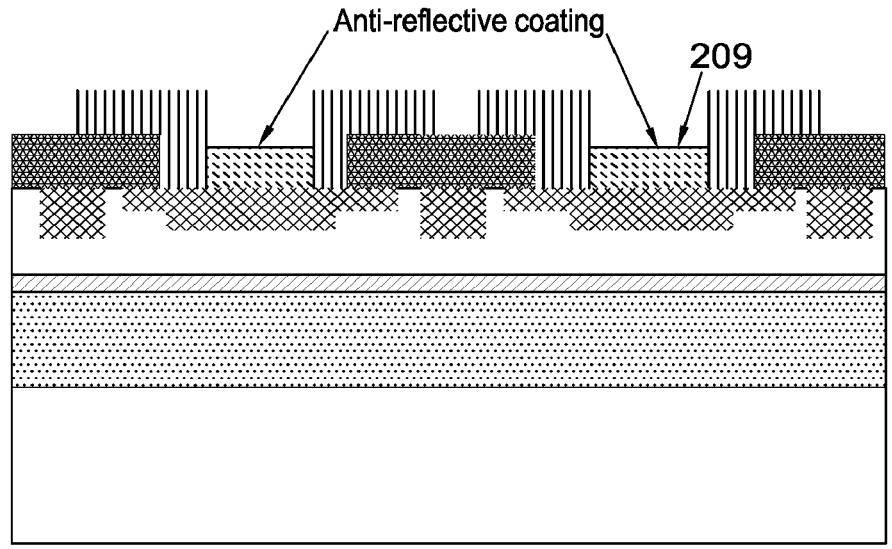

FIG. 2(d) shows the fabrication sequence for a device such as is shown in FIGS. 2(a), 2(b) and 2(c). The photon detection device may be fabricated using integrated circuit processing.

The basis for the heterostructure is a substrate 201, on which the subsequent layer structure is fabricated. The substrate may be an InP substrate for example.

A uniform heterolayer, the second layer 202, is deposited on said substrate 201. The second layer 202 may be an un-doped or lightly doped n-type InGaAs layer for example.

A uniform n+ type heterolayer, the highly doped layer 204, is deposited on said second layer 202. This layer may be a highly doped n-type InP layer for example.

A uniform layer, the first layer 203 is deposited on said highly doped layer 204. The first layer 203 may be un-doped or lightly doped n-type InP for example.

A cross-sectional view of the device at this stage in fabrication is shown in i.

Areas of highly-doped p-type material 205 are incorporated into the first layer 203. The areas may be incorporated by Zn diffusion, or alternatively by gas immersion laser doping or ion implantation for example.

In an embodiment, further areas of highly doped material, forming the guard ring regions 206, are also incorporated into the first layer 203. The guard ring regions may be formed in the same step as the highly doped regions 205, or in a separate step, and by the same method or by a different method.

A cross-sectional view of the device at this stage in fabrication is shown in ii.

In an alternative embodiment, the first 203 and second 202 layers may be silicon, in which p-type and n-type doping may be achieved using Boron or Phosphorous impurities respectively. The device may alternatively be based on a Silicon—Germanium heterostructure or based on any of the III-V class of semiconductors.

In an alternative embodiment, the device comprises highly n-doped regions 205 which are incorporated into a moderately doped n-type heterolayer 203, for example by gas immersion laser doping, implantation or diffusion.

The passivation layer 207 is deposited on the surface of the device, except for a portion of the surface above each highly doped region 205. The passivation layer 207 may be a dielectric, for example silicon nitride or silicon oxide.

A cross-sectional view of the device at this stage in fabrication is shown in iii.

The metal contact region 208 corresponding to each detection region is then deposited on the edge portion of the passivation layer and the outer portion of the inner portion of the highly doped region 205. For example, the metal contact region 208 may be a Chromium/Gold double layer where the highly doped p-type regions are InP. The metal contact region on the opposite surface of the substrate to the fabricated layers 210 may be a different metal or semiconductor.

A cross-sectional view of the device at this stage in fabrication is shown in iv.

An anti-reflective coating 209 may be deposited on the remaining portion of the highly doped regions 205. The material of the anti-reflective coating 209 may depend on the wavelength of light intended for the detector. For example, for an InP based detector, silicon nitride with a selected thickness may be used so that the reflection at the surface is minimal.

A cross-sectional view of the device at this stage in fabrication is shown in v.

Figure 3A:
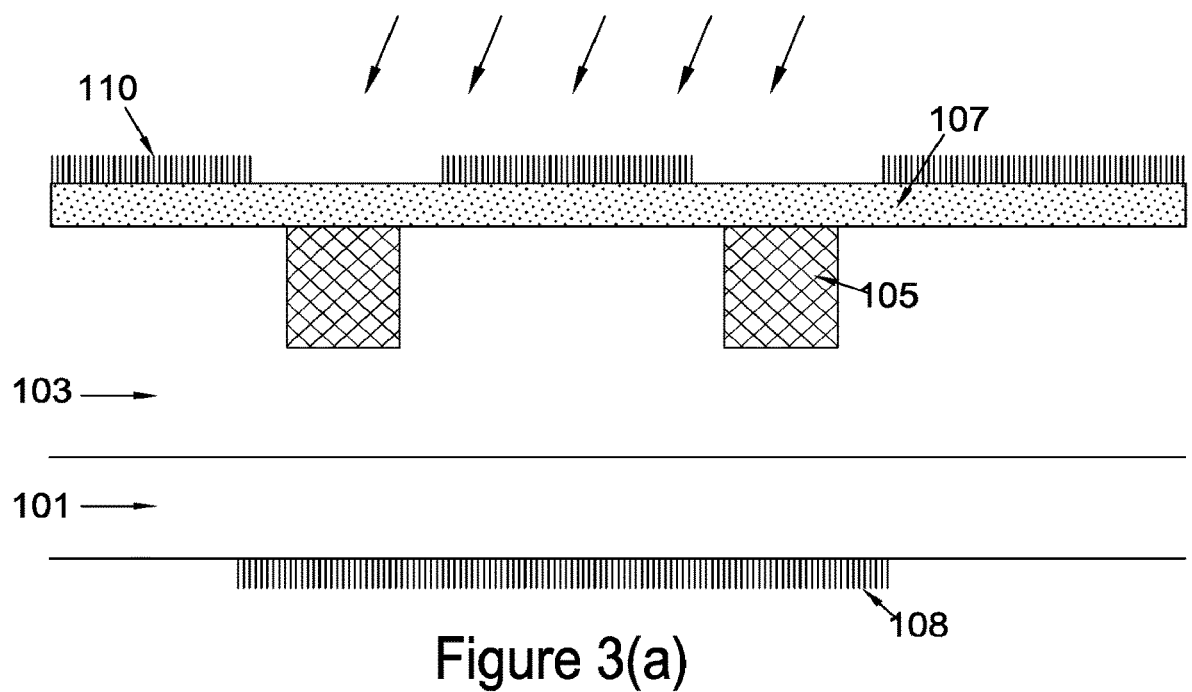
FIG. 3(a) is a schematic illustration of a cross-sectional view of an avalanche photodiode (APD) which is part of a photon detection device.
Figure 3B:
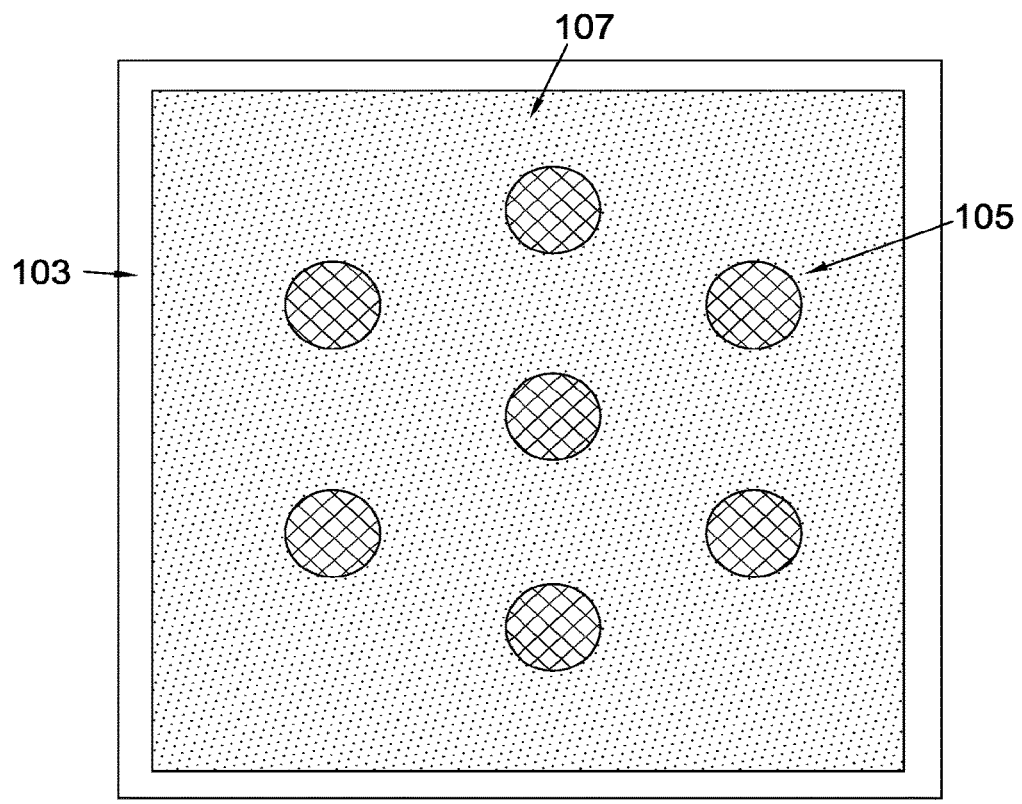
FIG. 3(b) shows the corresponding plan view.
Figure 3C:
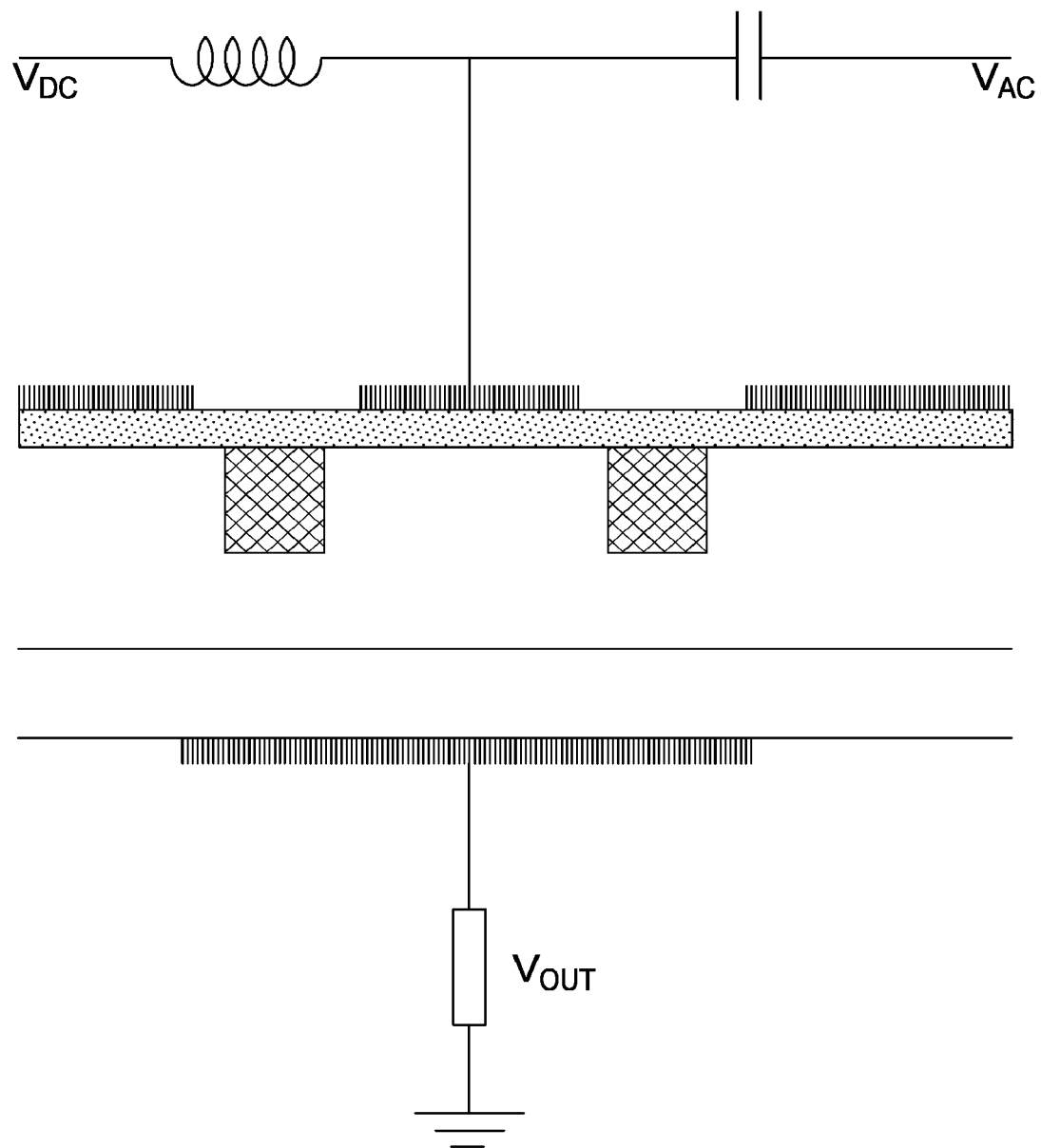
FIG. 3(c) shows a schematic illustration of the APD showing the circuit connections to the APD.

FIG. 3(*a*) is a schematic cross-sectional view of an avalanche photodiode (APD) which is part of a photon detection device in accordance with an embodiment. In this device, the electrical coupling between detection regions is through a single semiconductor layer. FIG. 3(*b*) shows the corresponding plan view.

The APD comprises a layer of a first conductivity type 103 and a layer of a second conductivity type 107 overlying and in contact with the layer of the first conductivity type 103. In this particular embodiment, the layer of the first conductivity type 103 is overlying and in contact with a substrate 101. However, intermediate layers such as buffer layers may be provided. In this particular embodiment, the layer of the first conductivity type 103 is a p-type layer and the layer of the second conductivity type 107 is an n-type layer. However, it will be appreciated that the order of the layers could be changed. A p-n junction is formed at the interface between the first layer 103 and the second layer 107. The device may be Silicon based for example.

The first layer 103 comprises regions 105 which have a higher dopant concentration than the remainder of the layer 103. These regions will be formed as "islands", so that they are laterally separated from other high dopant concentration regions.

The highly doped regions 105 are located at the surface of the first layer 103 and are in contact with the second layer 107. The depth of the highly doped regions is less than the depth of the first semiconductor layer 103. The light impacts this surface of the device.

The highly doped regions 105 have a circular shape seen in the plan view, in other words they have a cylindrical shape. The highly doped regions can in principle be any shape however, including polygonal and rounded, with the overall geometry being matched to the cross-sectional shape of the corresponding core of the multicore fibre.

The fabrication of the structure will now be described.

The basis for the heterostructure is a p-type Silicon substrate 101, on which the subsequent layer structure is fabricated. A uniform p-type heterolayer 103 is deposited on said substrate 101. Areas of highly-doped p-type material 105 are incorporated into said layer 103. These areas may be incorporated by gas immersion laser doping, ion implantation or drive-in diffusion, for example. Other layer types with different doping areas can be fabricated, for example depending on the spectral region of interest. For example, the device may be InP based.

A layer of highly-doped n-type material 107 is subsequently grown across an area to encompass all of the highly-doped p-type regions 105, for example by gas immersion laser doping, implantation or diffusion.

A single cathode 110 is connected to the n-type layer 107 and a single anode 108 is connected to the opposite side of the substrate 101. The highly doped regions 105 are exposed, that is there are gaps in the anode 108 such that light can impact these regions of the device.

FIG. 3(*c*) shows a schematic illustration of the APD showing the circuit connections to the APD in accordance with an embodiment.

The APD may be operated in Geiger mode. In Geiger mode operation, a reverse voltage that exceeds the breakdown voltage is applied to the APD. Light incident on the exposed areas is absorbed in the detection region and generates carriers. The high electric field across the interface between the highly doped p-type islands 105 and the n-type material 107 means that avalanche multiplication occurs in these detection regions when a voltage above the breakdown voltage is applied across the junction. The generated carriers are thus multiplied in the avalanche multiplication region. The resultant output signal, $V_{OUT}$, is measured at the anode contact 108. $V_{OUT}$ is the output from all of the detection regions. In this embodiment, it is not possible to determine which detection region has detected a photon from the output of the photon detection device 1 alone, however, when connected to a multicore fibre it is possible to determine which detection region detected from the input of the fibre for example, that is into which core of the fibre light entered. The regions 105 constitute active zones of the device, and form the detection regions. Only a low-electric field is formed between the moderately doped p-type layer 103 and the n-doped layer 107, which is not sufficient to support avalanching and therefore acts as an optically inactive spacer between the active zones when operated in the Geiger mode. Further doped areas, i.e. guard rings as described in relation to FIG. 2 may be included between the highly doped regions 105, in order to minimise electrical crosstalk. Alternatively, trenches may be etched between the highly doped regions 105 to eliminate electrical and optical crosstalk.

For a gated photon detector, a time varying voltage may be applied through a bias tee circuit. An AC voltage component $V_{AC}$ and a DC voltage component $V_{DC}$ are combined using the bias-tee circuit. The bias tee circuit comprises, on a first arm of the tee, a capacitor connected to the AC voltage source and, on the second arm of the tee, an inductor connected to the DC voltage source. The bias tee circuit is connected to the cathode contact of the APD, i.e. metal contact 110. The bias voltage applied to the APD thus comprises both a DC component and an AC component. The bias voltage applied to the APD is above the breakdown voltage at its highest values and below the breakdown voltage at its lowest values. When the bias voltage exceeds the breakdown voltage, the detector is gated "on", when it is below the breakdown voltage, the detector is gated "off". The frequency of the AC voltage component is thus the gating frequency. The gating frequency may be synchronised with the driving frequency of the photon source in a QKD system for example.

The DC component may be set below the breakdown voltage. Alternatively, the DC bias may be larger in magnitude than the reverse breakdown voltage.

In alternative embodiments, the photon detection device is not gated, and is operated in continuous mode. A DC voltage which exceeds the breakdown voltage is applied.

Depending on the operation temperature and the device structure, the breakdown voltage for APDs can vary from a few volts to several hundred volts depending on the materials used. Large bandgap materials such as SiC may have very large breakdown voltage.

The output of the APD is measured at a resistor which is connected to ground. The anode contact 108 is connected to the resistor. When a photon is incident, an avalanche photocurrent is induced, which leads to a voltage across the resistor corresponding to the output voltage, $V_{out}$.

The depth of the highly-doped layers 105 and 107 is less than the depth of the first layer 103 and can be less than 4 μm such that a thin junction with a shallow depletion region is achieved, with the APD having a corresponding low breakdown voltage. The junction depth may also be larger than this, for example 30 μm or above, such that a deep junction device is satisfied with a large breakdown voltage.

In an embodiment, the output is connected to a self-differencing circuit. In a self-differencing mode of operation, the background of the output signal is removed by comparing a part of the signal with an earlier part of the signal.

In a further embodiment, the circuit comprises a discriminator configured to compare the measurement of the avalanche event with multiple predetermined levels.

The highly doped regions 105 and the adjoining portions of the n-type layer 107 form the active avalanche regions of the device and the size, geometry and arrangement of these regions, in relation to the intermediate low-field regions, can be controlled by manipulating the 2-D doping profile in the plane of the p-n junction according to the size, geometry and arrangement of the cores in the multicore fibre.

FIG. 3(b) shows the corresponding plan view of the APD of FIG. 3(a) in which the active regions formed by the semiconductor junction between highly doped p-type 105 and n-type 107 layers are arranged in a configuration which matches that of the multicore fibre.

The highly doped regions 105 form circular islands. The high field zones can in principle be any shape, including polygonal and rounded, with the overall geometry being matched to the cores in the multicore fibre.

In an embodiment, the high field zones will have a doping concentration of at least $10^{16}$ cm$^{-3}$, in a further embodiment at least $10^{17}$ cm$^{-3}$ or $10^{18}$ cm$^{-3}$. The doping concentration of the lower field zones being at least a factor of 10 lower than that for the high field zones, in a further embodiment a factor of 100 lower.

FIG. 4 is a schematic illustration of a photon detection device 1 in accordance with an embodiment, and a multicore optical fibre 2.

The photon detection device 1 is configured to couple to the multicore optical fibre 2. The photon detection device 1 comprises a plurality of detection regions. In this embodiment, the photon detection device 1 comprises 13 detection regions. The multicore optical fibre comprises 13 cores. The detection regions are arranged such that when the photon detection device 1 is coupled to the multicore optical fibre 2, each detection region is aligned with just a single core of the multicore optical fibre 2.

The detection regions are arranged such that there is a single detection region surrounded by a ring of further detection regions. The further detection regions may not be arranged exactly in a circular fashion around the central detection region, but may be offset from a circular ring. The further detection regions may be substantially equally spaced from the central detection region. The further detection regions may be substantially equally spaced from each other.

In this case, there is a single detection region surrounded by a ring of 12 further detection regions. The detection regions do not form a close packed structure. In an embodiment, there may be only a single orientation of the photon detection device 1 relative to the fibre for which the alignment is sufficient.

The detection regions comprise avalanche multiplication regions integrated on a semiconductor substrate.

The detection regions have a circular shape, seen in the plan view. Alternatively, the detection regions can be any shape, including polygonal and rounded, with the overall geometry being matched to the cross-sectional shape of the corresponding core of the multicore fibre.

A metal contact region 208 surrounds each detection region. Each metal contact region 208 is a ring shaped region arranged around the outside of the detection region.

For each detection region, there is a corresponding contact. In this case the contact is an anode contact, however it will be appreciated that this could alternatively be a cathode contact. Each anode contact is connected to a metal contact region 208.

Each detection region may have a corresponding guard ring 206.

The photon detection device 1 may comprise photon detection regions fabricated by other methods, for example photon detection regions comprising superconductors or nanowires. Such detection regions may also be manufactured using integrated circuit manufacturing methods but require cooling to cryogenic temperatures, for example 4K, in use.

Figure 5A:
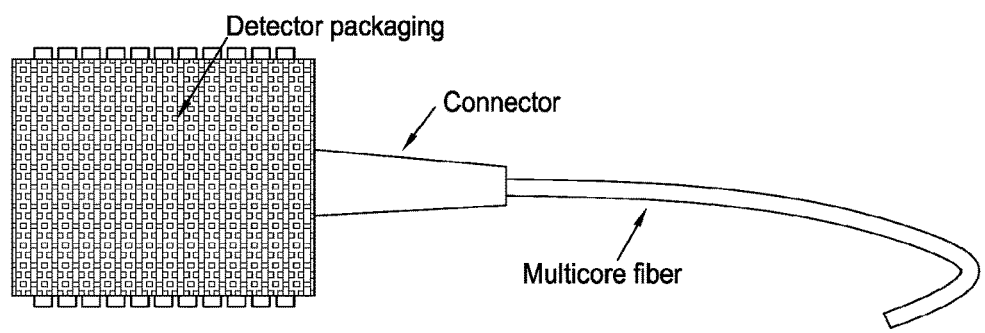
FIG. 5(a) is a schematic illustration of an assembly comprising a photon detection device and a multicore fibre coupled to the photon detection device.

FIG. 5(a) is a schematic illustration of an assembly comprising a photon detection device 1 and a multicore fibre 2 coupled to the photon detection device 1 in accordance with an embodiment. The photon detection device 1 is contained within the detector packaging. Further components such as the driving electronic circuitry for the detection device, for example a self-differencing circuit, may also be contained in the detector packaging.

In an embodiment, the photon detection device is connected to the multicore fibre using a "pigtail" component. A pigtail component may comprise a multicore fibre with a fibre optic connector at one end. The fibre optic connector is configured to connect to the photon detection device. The fibre optic connector may be a mechanical connector, for example it may be a male or female mechanical connector. The photon detection device comprises the corresponding mating connector. The other end of the pigtail component may be permanently coupled to the multicore fibre, for example by fusion or mechanical splicing.

In alternative embodiments, a fibre optic connector is attached directly to the end of the multicore optical fibre, and no pigtail device is used. In further alternative embodiments, the multicore optical fibre 2 is coupled to the photon detection device 1 by fusion or mechanical splicing.

Figure 5B:
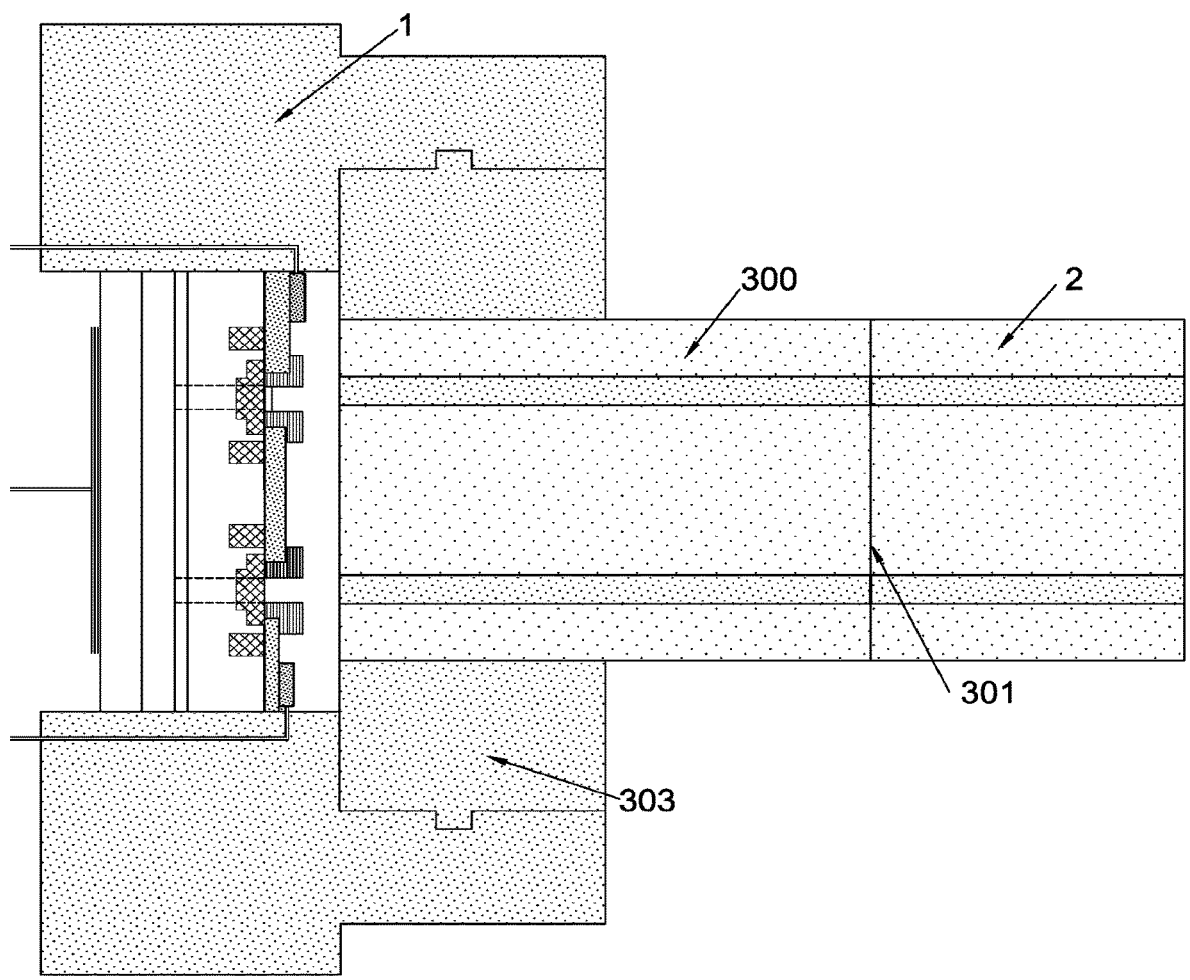
FIG. 5(b) is a schematic illustration of an assembly comprising a photon detection device and a multicore optical fibre, shown in cross-section.

FIG. 5(b) is a schematic illustration of an assembly comprising a photon detection device 1 and a multicore optical fibre in accordance with an embodiment, shown in cross-section. In this case, the multicore fibre 2 is connected to the photon detection device 1 via a snap type coupling. The pigtail component 300 is coupled to the multicore fibre 2 at one end, for example by fusion or mechanical splicing, at point 301. The other end of the pigtail component comprises a snap type fibre optic connector 303.

In alternative embodiments, the fibre optic connector 303 may be a screw type connector, a clip type connector, a push-pull type connector, a bayonet type connector or another type of mechanical connector.

In this case, the pigtail component 300 comprises a male fibre optic connector 303. The photon detection device 1 comprises a corresponding female fibre optic connector. However, the pigtail component 300 may comprise a female connector and the photon detection 1 device a male connector.

In an embodiment, the connector is configured so that when connected, the detection regions align with the cores in the multicore fibre.

Figure 6A:
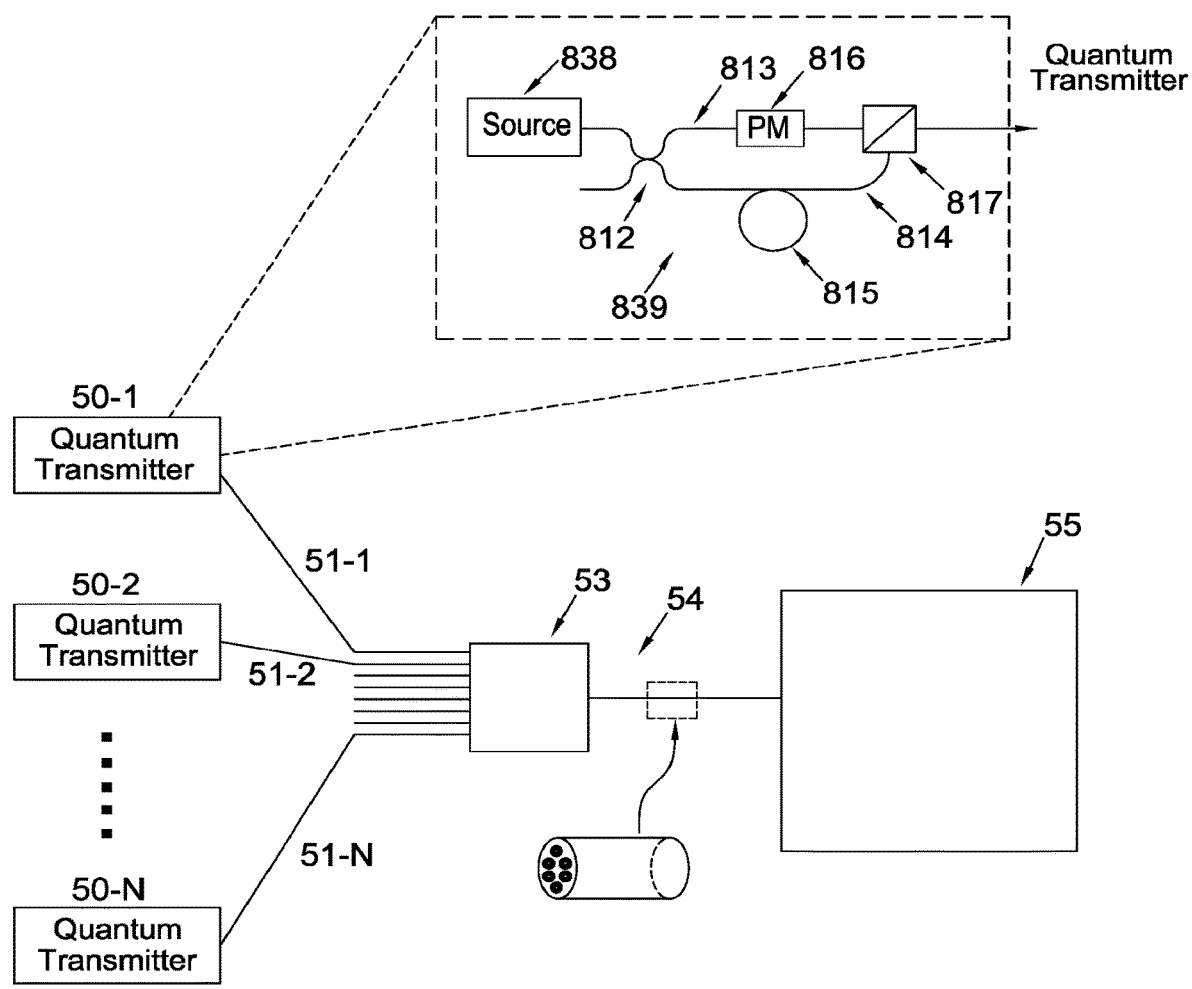
FIG. 6(a) is a schematic illustration of a quantum communication system.

FIG. 6(a) is a schematic illustration of a quantum communication system according to an embodiment.

The system comprises multiple quantum communication devices 50-1 to 50-N, each optically coupled to a first waveguide 51-1 to 51-N. Each of the first waveguides 51-1 to 51-N is connected to a fibre fan-out 53. The multicore optical fibre 54 is optically coupled to the other side of fibre fan-out 53.

In the system shown, the quantum communication devices comprise quantum transmitters, however some or all of the devices may comprise quantum receivers.

A fibre fan-out 53 may comprise a fibre bundle comprising a plurality of optical fibres, wherein the outer diameter of the cladding at a first end of each optical fibre in the fibre bundle is less than or equal to the smallest distance between the cores in the multi-core optical fibre 54, and wherein a first optical fibre in the fibre bundle is optically coupled at the first end to a first core in the multi-core optical fibre 54 and at the other end to a first waveguide 51-1, a second optical fibre in the fibre bundle is optically coupled at the first end to a second core in the multi-core optical fibre 54 and at the other end to a second waveguide 51-2 and so on.

Alternatively, a fibre fan-out 53 may comprise a photonic chip, comprising a plurality of waveguides, wherein the spacing between the waveguides on the photonic chip at a first end is substantially equal to the distance between the cores in the multi-core optical fibre 54, and wherein a first waveguide on the photonic chip is optically coupled at the first end to the first core in the multi-core optical fibre 54 and at the other end to the first waveguide 51-1, a second waveguide on the photonic chip is optically coupled at the first end to the second core in the multi-core optical fibre 54 and at the other end to the second waveguide 51-2 and so on.

Fibre fan-out 53 directs signals transmitted from the waveguide 51-1 into a first core of the multicore waveguide 54 and signals transmitted from the second waveguide 51-2 into a second core of the multicore fibre 54, and so on. The fibre fan-out 53 connects several fibres 51-1 to 51-N to a multi-core fibre 54. Each core in the multi-core fibre 54 is optically coupled to a waveguide 51-1 to 51-$n$ through the fibre fan-out 53.

Thus the multi-core fibre 54 is coupled to a fibre-fan out 53 (to separate the cores) and then to a plurality of waveguides 51-1 to 51-N, each of which is optically coupled to a quantum transmitter 50-1 to 50-N.

Different combinations of quantum and classical transmitters and receivers are possible.

In the following description, the quantum transmitters 50-1 to 50-N are based on asymmetrical Mach-Zehnder interferometers (MZI). Other configurations for generating coherent double pulses with a chosen phase difference may be used. Alternatively, information may be encoded upon a different property of the photon, such as its polarization, energy/time or angular momentum.

Quantum transmitters 50-1 to 50-N and quantum receiver 55 are optically coupled through fibres 51-1 to 51-N, fibre fan-out 53 and multicore optical fibre 54. Fibre 54 comprises at least two cores. The quantum transmitter 50-1 and quantum receiver 55 are optically coupled through a first core. The quantum transmitter 50-2 and quantum receiver 55 are optically coupled through a second core and so on.

Fibre fan-out 53 is configured to optically couple the waveguide 51-1 to a first core in the multicore fibre 54 and the waveguide 51-2 to a second core in the multicore fibre 54, and so on.

Photon source 838 inside quantum transmitter 50-1 generates a quantum signal, comprising pulses of light. The pulses are then encoded using the asymmetrical MZI 839. The pulses are directed into a beam splitter 812. One output of the beam splitter 812 is optically coupled to a phase modulator 816. The output of the phase modulator 816 is optically coupled to polarising beam combiner 817. This forms the short arm 813 of the interferometer. The other output of the beam splitter 812 is optically coupled to a delay component 815, which may be a fibre loop, or a fixed or variable delay line, which is in turn optically coupled to polarising beam combiner 817. This forms the long arm 814 of the interferometer. Light pulses travelling the long arm 814 are delayed with respect to light pulses travelling the short arm 813.

Quantum transmitter 50-1 may also comprise an intensity modulator configured to vary the intensity of light pulses. The intensity modulator may be configured to realise a decoy-state QKD protocol, in which pulses of different intensities are sent which allows the sender and receiver to determine the presence of an eavesdropper by measuring the number of pulses which have been safely received with the different intensities. The quantum transmitter 50-1 may comprise more than one intensity modulator.

Phase modulator 816 is configured to apply a modulation to the phase of a light pulse travelling the short arm 813. A phase modulator can comprise a crystal, such as a $LiNbO_3$ crystal, in which the refractive index is a function of electric field strength. Alternatively the phase modulation can be provided by passive means, for example, a plurality of fixed phase elements which are each configured to apply a different fixed phase difference and a switch configured to select each of the said components.

The polarisation of a light pulse from the short arm 813 of the interferometer is flipped by the polarizing beam combiner 817, from a first polarisation to a second polarisation, which is orthogonal to the first polarisation. The quantum transmitter 50-1 therefore generates coherent double pulses with a chosen phase difference and orthogonal polarization travelling down the fibre 51-1.

These pulses exit the quantum transmitter 50-1 and are sent via fibre 51-1 to fibre fan-out 53. Fibre fan-out 53 sends signals inputted from fibre 51-1 into multicore fibre 54, in a first core. The quantum signals from the first transmitter 50-1 are thus sent via the first core of fibre 2. A polarisation controller may be included between each quantum transmitter 50-1 to 50-N and the fibre fan-out 53.

Quantum signals comprising coherent double pulses with a chosen phase difference and orthogonal polarizations are generated at each quantum transmitter, and may be generated in a similar manner or using a different configuration. The quantum signal from each quantum transmitter 50-1 to 50-N is sent via a separate core of the multicore fibre 54 to the receiver 55. The output of several quantum transmitters is thus multiplexed onto a multi-core fibre 54. The transmitters may be in different locations, as in an access network scenario, or they could be in the same location. In the latter scenario, the QKD transmission bandwidth is increased through spatial multiplexing. Each of the quantum transmitters 50-1 to 50-N may be seen as a single QDK system in this case.

The outputs from two or more quantum transmitters 50 are coupled to a multicore optical fibre 54 via a fibre fan-out 53. The output from each transmitter is coupled to a separate core in the multicore fibre 54. The output of several quantum transmitters is multiplexed onto a multi-core fibre 54.

Figure 6B:
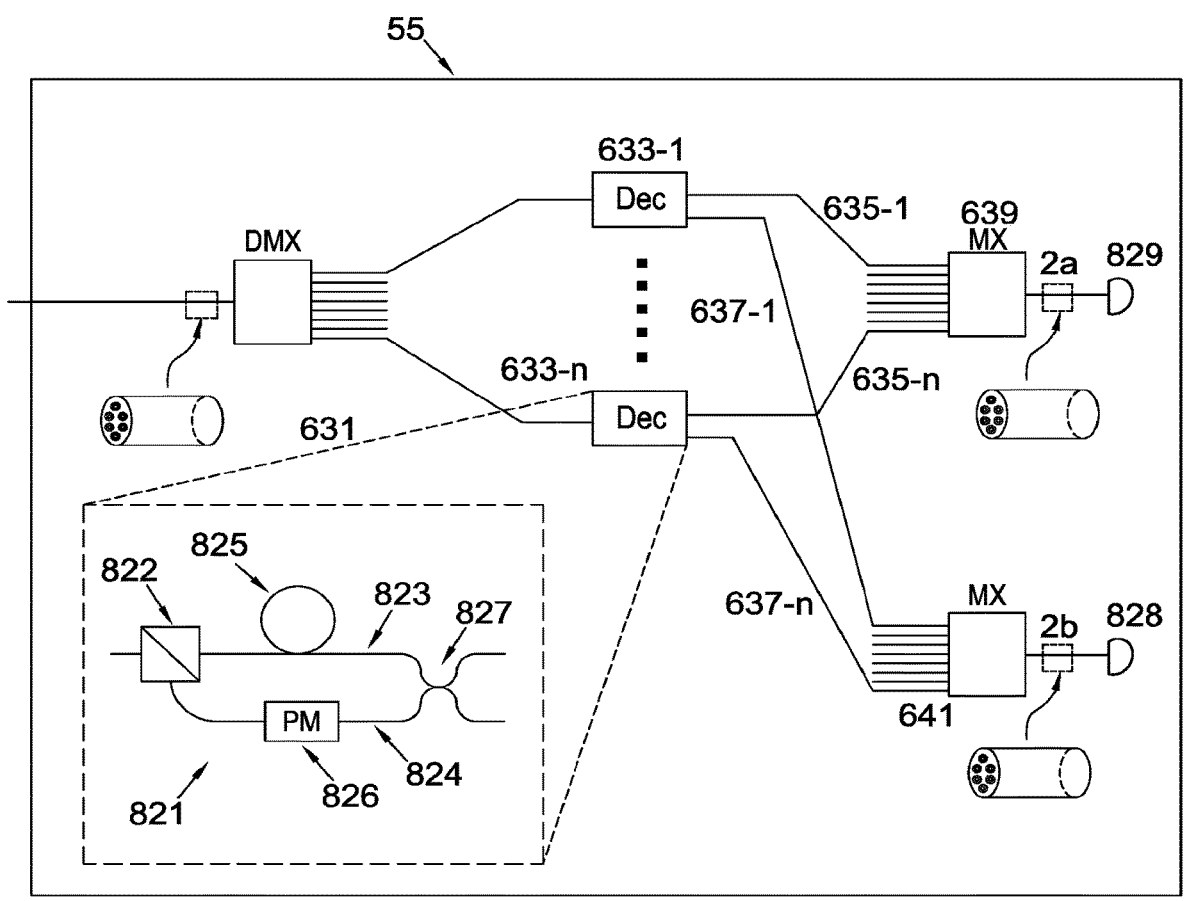
FIG. 6(b) is a schematic illustration of a quantum receiver.

Details of the receiver 55 are shown in FIG. 6(b). The receiver 55 comprises a de-multiplexing component, which may be a first fibre fan-out 631. The first fibre fan-out 631 is configured to optically couple a first core in the multicore fibre 54 to a first waveguide, a second core in the multicore fibre 54 to a second waveguide, and so on. The first fibre fan-out 631 couples each core in the multicore waveguide 54 to a separate single core waveguide, such that the pulses from each transmitter are de-multiplexed into a separate waveguide. Alternatively, the signals from each transmitter 50 may be sent to the receiver on separate waveguides, in which case the fibre fan-out 631 is not included, and each waveguide is coupled directly to the corresponding decoding unit 633.

The pulses are then decoded at the receiver using an asymmetrical MZI 821 corresponding to each transmitter. The receiver 55 comprises a decoding unit 633 corresponding to each transmitter. The single waveguide transporting the signal from each transmitter from the fibre fan-out 631 is coupled to the corresponding decoding unit 633. In order to decode the information sent with the photons, each decoding unit comprises at least two outputs. Each decoding unit 633 may comprise an asymmetric Mach-Zehnder interferometer with a phase modulator in one arm. The outputs from all the decoding units 633 are then multiplexed onto a single or several multi-core fibres by one or more multiplexing components, the multi-core fibres being connected to one or more photon detection devices as described in relation to FIGS. 1 to 5 above. In this system, only one multiplexing step is used.

Each decoding unit 633 comprises a polarising beam splitter 8252. In the decoding unit 633, the single waveguide transporting the signal from a transmitter from the fibre fan-out 631 is optically coupled to a polarising beam splitter 822. One output of the polarising beam splitter 822 is optically coupled to a phase modulator 826 by a multicore optical fibre. The output of the phase modulator 826 is optically coupled to one of the inputs of the beam splitter 827 by another multicore optical fibre. This forms the short arm 824 of the interferometer 821. The other output of the polarising beam splitter 822 is optically coupled to a multicore optical fibre comprising a delay component 825, for example a fibre loop or a fixed or variable delay line. The output of the delay component 825 is optically coupled to the other input of beam splitter 827. This forms the long arm 823 of the interferometer. The delay provided by the delay component 825 exactly matches the delay component 815 in the corresponding transmitter.

The polarizing beam splitter 822 sends a light pulse that enters with the second polarization down the long arm 823 of the interferometer and a light pulse that enters the polarizing beam splitter 822 with the first polarization down the short arm 824. The polarization of a pulse travelling through the polarizing beam splitter 822 with the second polarisation is flipped to the first polarisation.

The outputs of beam splitter 827 are each connected to a first fibre 635 and a second fibre 637.

For each decoding unit 633, the first output fibre 635 is coupled to a multiplexing component, which may be a second fibre fan-out 639. The second fibre fan-out 639 couples each of the first outputs from the decoding units 633 into a core of a multicore fibre 2a. A fibre fan-out may comprise a fibre bundle comprising a plurality of optical fibres, wherein the outer diameter of the cladding at a first end of each optical fibre in the fibre bundle is less than or equal to the smallest distance between the cores in the multi-core optical fibre 2a. Alternatively, a fibre fan-out may comprise a photonic chip, comprising a plurality of waveguides, wherein the spacing between the waveguides on the photonic chip at a first end is substantially equal to the distance between the cores in the multi-core optical fibre 2a.

The second output fibres 637 are coupled to another multiplexing component, which may be a third fibre fan-out 641. The third fibre fan-out 641 couples each of the second outputs from the decoding units 633 into a core of a multicore fibre 2b.

The multicore optical fibre 2a is connected to photon detector 829 and the multicore fibre 2b is connected to photon detector 829. The photon detector 829 is configured to couple to the multicore optical fibre 2a and the photon detector 828 is configured to couple to the multicore optical fibre 2b. The photon detectors 829 and 828 each comprise a plurality of detection regions. Each detection region aligns with just a single core of the corresponding multicore optical fibre when connected. The photon detectors 829 and 828 are photon detection devices such as described in relation to FIGS. 1 to 5 for example.

For a signal from a quantum transmitter 50-1 to 50-N, depending on the phase modulation applied at the transmitter and the receiver 55, a signal will either be detected in photon detector 828 or in photon detector 829. Photon detectors 828 and 829 are photon detection devices such as described in FIGS. 1 to 5 for example.

For each transmitter, using phase modulator 816 and phase modulator 826 in the corresponding decoding unit 633 a Quantum Key Distribution protocol such as BB84 can be realized. In the BB84 protocol, Alice (at the transmitter 50-1) selects a phase value at random from four equally spaced phase values for each light pulse. For example, Alice can randomly set the phase modulator 816 to one of four different values, corresponding to phase shifts of 0, $\pi/2$, $\pi$, and $3\pi/2$. 0 and $\pi$ are associated with bits 0 and 1 in a first encoding basis, while $\pi/2$ and $3\pi/2$ are associated with 0 and 1 in a second encoding basis.

For each light pulse emitted at each transmitter, the phase modulator in the transmitter is randomly set to one of the four different values. In general, for each light pulse emitted at each transmitter, information is encoded on the light pulse using a property of the light pulse. The same property must be used for each transmitter, but the encoding is performed randomly at each transmitter for each light pulse.

Bob (at the receiver 55) can randomly select between a first and second measurement basis for each decoding unit 633.

In this case, for each decoding unit, Bob randomly sets the phase modulator 826 to one of two values, corresponding to a phase shift of 0 or π/2. This amounts to selecting between the first and second measurement bases, respectively. In this case, Alice's 0 and π values are compatible with Bob's 0 value (first basis), and Alice's π/2 and 3π/2 values are compatible with Bob's π/2 value (second basis).

For each decoding unit, a phase difference of 0 (i.e. the phase shift applied by Alice is 0 and the phase shift applied by Bob is 0 or the phase shift applied by Alice is π/2 and the phase shift applied by Bob is π/2), leads to a detection at detector 828. If, on the other hand, there is a phase difference of 7 (i.e. the phase shift applied by Alice is 7 and the phase shift applied by Bob is 0 or the phase shift applied by Alice is 3π/2 and the phase shift applied by Bob is π/2) there will be a detection at detector 829. For any other value of difference between the phase modulation applied at the two phase modulators, there will be a finite probability that a photon may output at detector 828 or detector 829.

The signal from each quantum transmitter 50-1 to 50-N leads to a separate detection at either detector 828 or 829. The measurement result for each quantum transmitter 50-1 to 50-N is then recorded.

None of the quantum transmitters 50-1 to 50-N or the receiver 55 knows what values the others choose or will choose when choosing their values. Only afterwards does the receiver 55 compare separately with each transmitter 50-1 to 50-N whether they used the same basis. Only the values for the final key where the same basis was used are kept. The results from any measurements performed using a different basis are discarded. This process is known as sifting.

In order to form the key, the sifting process is initiated by communication of the time arrival and decoding basis between a classical communication device at the quantum transmitter 50-1 and a classical communication device at the receiver 55. Repeating this process for each detected photon, a sifted key sequence with lengths of, for example, at least a few thousands bits is formed for the first quantum transmitter 50-1. Then, error correction and privacy amplification processes are used to distil a perfectly secret key between the particular transmitter and receiver pair. Error correction and privacy amplification also involve communication over the classical channel. This is performed for each quantum transmitter 50-1 to 50-N, such that a key is formed for each quantum transmitter 50-1 to 50-N.

As the transmission and detection can be performed simultaneously for each quantum transmitter 50-1 to 50-N, keys can be simultaneously generated for a large number of transmitters using a single receiver, and only two photon detection devices 829 and 828.

The system of FIGS. 6(a) and (b) is an example of how to implement a QKD network using the BB84 protocol. Other quantum communication protocols and optical setups can also be implemented using a photon detector such as described, for example, coherent-one-way protocol or differential phase shift protocol. Two-way QKD systems (where laser pulses are launched by Bob, modulated and attenuated at Alice and then sent back to Bob where they are detected) can also be implemented using photon detection devices as described herein.

A plurality of quantum transmitters, quantum receivers and classical communication devices may be connected by a multicore fibre. However, for simplicity, only quantum transmitters and one quantum receiver are shown.

The system may operate at a single clock frequency. A synchronisation channel between each transmitter 50-1 to 50-N and the receiver 55 may be realised through a classical channel. A synchronisation signal (for example a clock signal) may be sent along each synchronisation channel from the receiver for example.

In an embodiment, a timing control module (not shown) in the receiver 55 provides a master clock signal which is used to synchronise one or more components in each of the quantum transmitters 50-1 to 50-N to one or more components in the quantum receiver 55.

As the detectors 828 and 829 are able to detect a signal from each core of the multicore fibre separately, signals from each quantum transmitter can be detected simultaneously, meaning there is no requirement to synchronise the transmissions between the quantum transmitters 50-1 to 50-N.

As each detection area of the photon detector 828 and 829 corresponds to a separate core of the multicore fibre, and thus a signal from a different quantum transmitter, the receiver can identify which transmitter has transmitted each pulse received from the location of the detection on the photon detector 828 and 829.

The timing control module (not shown) in the receiver may provide a system master clock. The phase modulator 826 and gated detectors 829 and 828 in the quantum receiver 55 may be synchronised to the master clock. The master clock signal may also be transmitted to each transmitter 50-1 to 50-N and used to drive the source 838 and the phase modulator 816 in the quantum transmitters 50-1 50-N.

Each detection region in the photon detectors 828 and 829 may be driven by a separate clock signal, and synchronised separately with the corresponding transmitter. Alternatively, all of the detection regions and the quantum transmitters 50-1 to 50-N may be synchronised with a single clock signal.

The master clock may be determined by the speed of the single photon detectors in the quantum receiver 55. For example, for self-differencing InGaAs APDs based single photon detectors, the master clock can be operated at 1 GHz or higher. The master clock does not have to be at the same frequency as the transmitter and detector, but could be lower, for example 250 MHz or 10 MHz.

A trigger signal may be generated from the master clock signal at the control unit in the transmitter unit, and used to drive the source 838 in each quantum transmitter 50-1 to 50-N. The sources may be driven at the same frequency or at a different frequency. During each trigger pulse, each source 838 outputs one optical pulse. An intensity modulator may modulate the intensity of each pulse on a pulse-by-pulse basis. Alternatively, direct modulation can be realized by varying amplitude of driving signals applied to the photon source 838.

The optical pulses are then fed into the Mach-Zehnder interferometer 839. The length difference between the two arms of the Mach Zehnder interferometer 839 corresponds to an optical propagation delay of $t_{delay}$. A photon travelling through the long arm 814 will lag a photon travelling through the short arm 813 by a time of $t_{delay}$ at the exit of the interferometer 839.

A trigger signal from the control unit in the transmitter unit may also be used to control the phase modulator 816, such that a phase modulation is applied when a light pulse is present.

The quantum optical pulses are then transmitted to the quantum receiver 55. The signal pulses are fed into the decoding units 633. The polarising beam splitter 822 divides the incident pulses with orthogonal polarisations. The phase modulator 826 may also be synchronised with the arrival time of the photons, using the master clock signal.

Multiple pulses from multiple transmitters travel through the receiver system simultaneously.

Due to the use of polarising components, there are, in ideal cases, only two routes for a signal pulse travelling from the entrance of the encoding interferometer 811 to the exit of the decoding interferometer 821:

i. Long Arm 814—Short Arm 824 (L-S) and ii. Short Arm 813—Long Arm 823 (S-L).

For initial adjustment, a variable delay line may be included in each transmitter interferometer 839, and adjusted to make the propagation time along routes (i) and (ii) almost equal for each transmitter 50-1 to 50-N, within the signal laser coherence time which may be a few picoseconds. This will ensure interference of the two paths for each transmitter 50-1 to 50-N.

The master clock signal may also be used to control the detectors 828 and 829, such that the detectors are gated on during the arrival of those photons that experience interference, i.e., photons travelling through the short arm of one interferometer and the long arm of the other interferometer.

Due to non-ideal polarisations, some photons travel either both short arms or both long arms, thus arriving at the detectors 828 and 829 with a time delay of $\pm t_{delay}$ respective with interfering photons. These non-interfering photons do not contribute to the key generation or key rate. Therefore, detection results of these photons should be discarded.

In order to avoid contamination of interfering photons, appropriate $t_{delay}$ may be chosen to ensure that (1) $t_{delay}$ is longer than the detector time resolution and (2) $t_{delay}$ is shorter than the receiver's system clock period. In one embodiment, $t_{delay}$ is half of the system clock period. For example, for a 1 GHz receiver, $t_{delay}$ is 500 picoseconds.

During quantum communication, a number of physical parameters may be actively stabilized, including the arm length matching between asymmetric Mach-Zehnder interferometers, the photon polarisation, and the photon arrival times.

Active stabilisation can be realised by a feedback control unit at the quantum receiver 55, configured to generate a separate feedback signal corresponding to each quantum transmitter 50-1 to 50-N. Each feedback signal is then transmitted through the classical channel to the corresponding quantum transmitter 50-1 to 50-N. A control unit (not shown) in each quantum transmitter 50-1 to 50-N then controls a component or components of the quantum transmitter based on the feedback signal.

Active stabilisation of the delay between two pulses, for example by arm length matching, can be realised through actively adjusting a tuneable phase delay in the transmitter interferometer 839 based on a feedback signal transmitted through the classical channel from the receiver 54 for example. The feedback signal can be the quantum bit error ratio (QBER) for the transmission from the particular transmitter. This can be minimised by tuning the tuneable phase delay. In other words, the control unit adjusts the tuneable phase delay each time the QBER feedback signal is received, in order to minimise the QBER. The QBER is available to send to the transmitter only after each error correction process. The latency in determining the QBER allows compensation of only slow variation of arm lengths.

In an alternative embodiment, it is possible to achieve faster compensation, by sending strong reference pulses through the quantum channel from each transmitter, substituting a small fraction of signal/decoy pulses. These reference pulses are not modulated in phase, and therefore the degree of interference of the reference pulses will indicate the status of the arm length matching. Detection results of the reference pulses from a particular transmitter can be transmitted to the transmitter through the classical channel by to be used as a feedback to adjust the tuneable phase delay.

The tuneable phase delay acts as a control element. It may be a fibre stretcher, driven by a piezo-electric actuator for example.

Alternatively, the two delays can be balanced by carefully controlling the length of fibre in the two interferometers. Fine adjustment of the phase length of the two optical paths can be achieved through either tuning the DC bias in the phase modulator in the transmitter, or adding an AC offset to the driving signal applied to the phase modulator.

In one embodiment, the polarisation drift can be actively stabilized using a polarisation controller in each quantum transmitter 50-1 to 50-N. Ideally, all photons passing through the encoder and decoder experience the interference at the beam splitter 827 and contribute to the key formation. However, polarisation drift in the fibres 51-1 to 51-N and multicore fibre 54 will cause photons be routed to the non-interfering paths, such as photons passing through either both long arms or short arms of the two interferometers. These non-interfering photons do not contribute to the key formation. They are automatically rejected in the case with gated photon detectors, or can be rejected using a timing discrimination window in the detector subsystem with free-running single photon detectors. In either case, polarisation drift reduces the photon count rate of interfering photons. By optimising this count rate, for example by adjusting a polarisation controller in the transmitter, this drift can be corrected for. The polarisation controller in each transmitter is adjusted based on the count rate corresponding to that transmitter in order to maximise the count rate. The corresponding count rate may be sent to each transmitter from the receiver via a classical channel.

The photon arrival time at the detectors 829 and 828 can also be corrected for by tuning the trigger time of the photon source 838 at the transmitter based on the photon detection results for the particular transmitter.

Figure 6C:
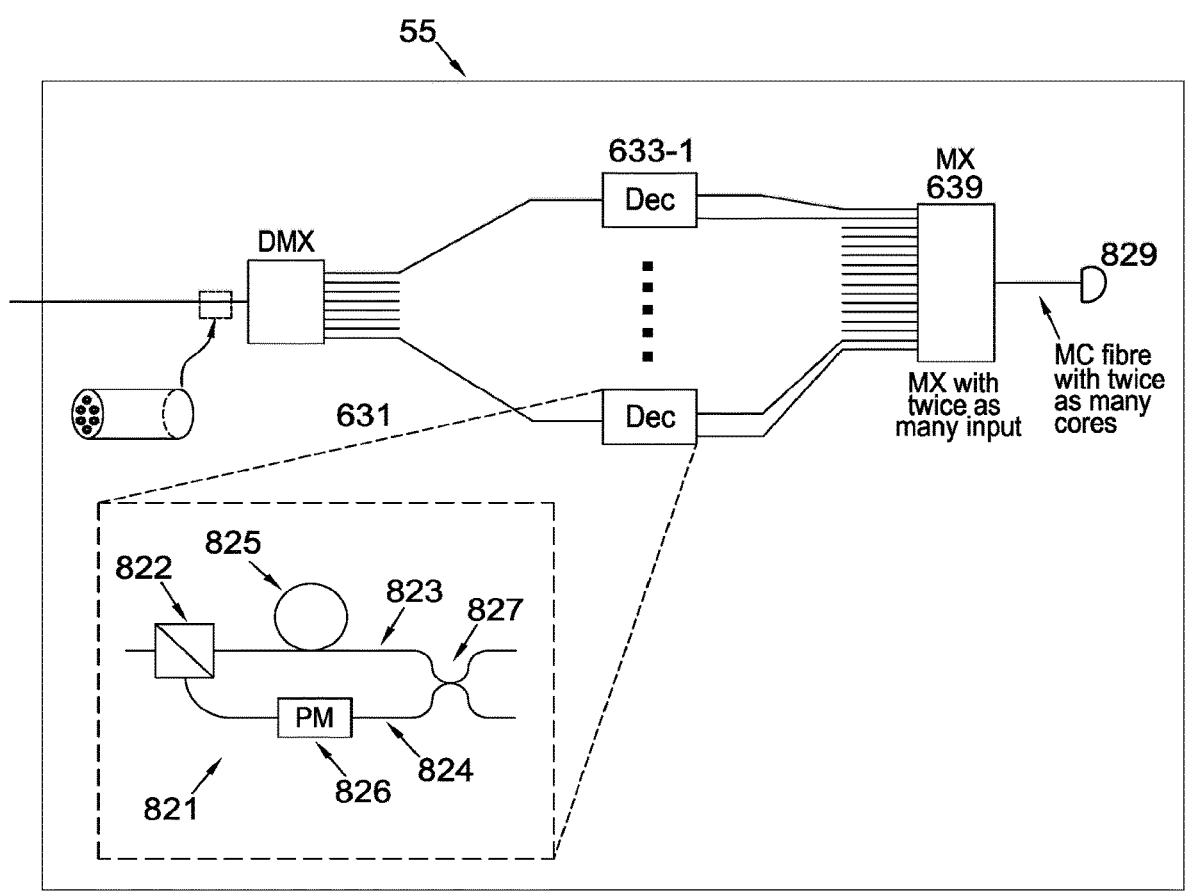
FIG. 6(c) is a schematic illustration of a quantum receiver.

FIG. 6(*c*) is a schematic illustration of a receiver in accordance with an alternative embodiment.

In this receiver, for each decoding unit 633, the first output fibre 635 and second output fibre 637 are coupled to the same multiplexing component. For example, for each decoding unit 633, the first output fibre 635 is coupled to a second fibre fan-out 639. The second fibre fan-out 639 couples each of the first outputs from the decoding units 633 into a core of a multicore fibre 2*a*. The second output fibres 637 are also coupled to the second fibre fan-out 639. The second fibre fan-out 639 couples each of the second outputs from the decoding units 633 into a core of a multicore fibre 2*a*.

In this receiver 55, each output from each decoding unit 633 is coupled into a core of the same multicore fibre 2*a*. A single photon detection device 829 is used to detect all of the signals from the decoding units 633.

For each decoding unit, a phase difference of 0 (i.e. the phase shift applied by Alice is 0 and the phase shift applied by Bob is 0 or the phase shift applied by Alice is π/2 and the phase shift applied by Bob is π/2), leads to a detection at one detection region in the photon detection device 829. If, on the other hand, there is a phase difference of π (i.e. the phase shift applied by Alice is π and the phase shift applied by Bob is 0 or the phase shift applied by Alice is 3π/2 and the phase shift applied by Bob is π/2) there will be a detection at a different detection region at the photon detection device 829. For any other value of difference between the phase modulation applied at the two phase modulators, there will be a finite probability that a photon may output at each detection region.

The detection regions in the photon detection devices described above may form an array of single photon detectors. The detection regions may be integrated on a photonic chip. The spatial distribution of the detection regions is such that each individual sensing element, or detection region is substantially aligned with a single optical core in the multicore optical fibre.

The detection regions may be fabricated on a semiconducting substrate or a layered semiconductor structure such that each detection region is sensitive to a single photon.

Each detection region may be independently or simultaneously activated by an electrical signal.

The minimum distance between the individual detection regions is limited by lithographic accuracy.

A photon detection device as described above may be used in a QKD system, a multiplexed compact optical sensor or a low light level detection device.

A photon detection device as described above may be used in position sensors using fibre optics.

While certain arrangements have been described, these arrangements have been presented by way of example only, and are not intended to limit the scope of the inventions. Indeed, the apparatuses and methods described herein may be embodied in a variety of other forms; furthermore various omissions, substitutions and changes in the form of the apparatuses described herein may be made.

The invention claimed is:

1. A photon detection device, configured to couple to a multicore optical fibre, the photon detection device comprising:
a plurality of detection regions, each of the plurality of detection regions being arranged to align with just a single core of the multicore optical fibre when the device is coupled to the multicore optical fibre, the photon detection device comprising a first semiconductor layer of a first conductivity type, and a second semiconductor layer, wherein each of the plurality of detection regions comprises a doped region in the second semiconductor layer, wherein doped regions of the detection regions are doped with a dopant of a second conductivity type, wherein each of the plurality of detection regions is surrounded by a guard ring that has the second conductivity type, wherein each of the plurality of detection regions is surrounded by a contact region, wherein the guard ring is arranged outside of the contact region with a distance between the guard ring and the contact region, wherein guard rings of the detection regions are located at a surface of the second semiconductor layer, wherein a depth of the guard ring is smaller than a depth of the second semiconductor layer, and wherein the detection regions are integrated on a semiconductor substrate and are configured to detect a single photon.

2. The photon detection device of claim 1, wherein the detection regions are arranged such that, in use, light emitted from a single core of a multicore optical fibre is detected at the detection region aligned with the single core.

3. The photon detection device of claim 1, wherein every detection region of the photon detection device is aligned with a single core of the multicore optical fibre when the photon detection device is coupled to the multicore optical fibre.

4. The photon detection device of claim 1, wherein a whole of a cross-sectional area of each core overlaps with at least a portion of a cross-sectional area of a corresponding detection region when the photon detection device is coupled to the multi core optical fibre.

5. The photon detection device of claim 1, wherein each core of the multicore optical fibre is aligned with just a single detection region when the device is coupled to the multicore optical fibre.

6. The photon detection device of claim 1, wherein an area of each detection region is greater than a cross-sectional area of a corresponding core.

7. The photon detection device of claim 1, wherein each detection region has an area of less than 50 µm2.

8. The photon detection device of claim 1, wherein the shortest distance between adjacent detection regions is between 40 µm and 200 µm.

9. The photon detection device of claim 1, wherein the detection regions are arranged in a radial formation around a single detection region.

10. The photon detection device of claim 1, wherein there are less than 20 detection regions.

11. The photon detection device of claim 1, wherein the detection regions comprise avalanche multiplication regions.

12. The photon detection device of claim 1, wherein the detection regions have a rounded shape.

13. An assembly, comprising the photon detection device of claim 1, and the multicore optical fibre.

14. A quantum receiver, comprising the assembly of claim 13.

15. The quantum receiver according to claim 14, further comprising a plurality of decoding units and a multiplexing component, the multiplexing component configured to multiplex one or more outputs from the decoding units onto the multicore optical fibre.

16. The quantum receiver according to claim 15, wherein the multiplexing component is a fibre fan-out.

17. A quantum communication system, comprising a plurality of quantum transmitters and the quantum receiver according to claim 14.

18. A method of designing a photon detection device configured to couple to a multi core optical fibre, the method comprising:
obtaining relative locations of a plurality of cores of the multicore optical fibre; and
determining locations of a plurality of detection regions of the photon detection device such that each of the plurality of detection regions is arranged to align with just a single core of the multicore optical fibre when the photon detection device is coupled to the multicore optical fibre, wherein the detection regions are integrated on a semiconductor substrate and are configured to detect a single photon,
wherein the photon detection device comprises a first semiconductor layer of a first conductivity type and a second semiconductor layer, wherein each of the plurality of detection regions comprises a doped region in the second semiconductor layer, wherein doped regions of the detection regions are doped with a dopant of a second conductivity type, wherein each of the plurality of detection regions is surrounded by a guard ring that has the second conductivity type, wherein each of the plurality of detection regions is surrounded by a contact region, wherein the guard ring is arranged outside of the contact region with a distance between the guard ring and the contact region, wherein a depth of the guard ring is smaller than a depth of the second semiconductor layer, and wherein guard rings of the detection regions are located at a surface of the second semiconductor layer.

19. A method of manufacturing a photon detection device configured to couple to a multicore optical fibre, the method comprising:

forming a first semiconductor layer which is doped with a dopant of a first conductivity type;

forming a second semiconductor layer;

forming a plurality of regions in the second semiconductor layer which are doped with a dopant of a second conductivity type, said regions being laterally separated and being aligned with just a single core of the multicore optical fibre when the device is coupled to the multicore optical fibre, and wherein said regions are configured to detect a single photon; and forming a guard ring at a surface of the second semiconductor layer surrounding each of the plurality of regions and being doped with a dopant of the second conductivity type;

depositing a contact region surrounding each of the plurality of regions, wherein the guard ring is arranged outside of the contact region with a distance between the guard ring and the contact region, wherein a depth of the guard ring is smaller than a depth of the second semiconductor layer, and wherein the first conductivity type is one selected from n-type or p-type and the second conductivity type is different to the first conductivity type and is selected from n-type or p-type.

* * * * *